(12) United States Patent
Sogah et al.

(10) Patent No.: US 7,947,774 B2
(45) Date of Patent: May 24, 2011

(54) ETHYLENE-VINYL ACETATE COPOLYMER OF INCREASED MECHANICAL PROPERTIES

(75) Inventors: Dotsevi Y. Sogah, Ithaca, NY (US); Yaru Shi, Greensboro, NC (US)

(73) Assignee: Cornell Research Foundation, Inc., Ithaca, NY (US)

( * ) Notice: Subject to any disclaimer, the term of this patent is extended or adjusted under 35 U.S.C. 154(b) by 454 days.

(21) Appl. No.: 11/976,102

(22) Filed: Oct. 22, 2007

(65) Prior Publication Data

US 2008/0211139 A1 Sep. 4, 2008

Related U.S. Application Data

(60) Provisional application No. 60/852,962, filed on Oct. 20, 2006.

(51) Int. Cl.
| | | |
|---|---|---|
| *C08J 5/18* | (2006.01) | |
| *C08K 3/34* | (2006.01) | |
| *C08K 9/04* | (2006.01) | |
| *C08K 11/00* | (2006.01) | |
| *C08L 1/14* | (2006.01) | |
| *C04B 28/26* | (2006.01) | |

(52) U.S. Cl. ............ 524/442; 264/328.17; 524/789; 524/790; 524/791; 524/445; 525/191; 525/236; 525/239; 525/222; 525/227; 525/228; 525/186

(58) Field of Classification Search .......... 524/445, 524/789, 790, 791; 264/328.17; 525/186, 525/191, 236, 239, 240, 222, 227, 228
See application file for complete search history.

(56) References Cited

U.S. PATENT DOCUMENTS

| 3,156,666 | A | 11/1964 | Pruett |
| 5,747,560 | A | 5/1998 | Christiani et al. |
| 6,087,433 | A | 7/2000 | Hanada et al. |
| 2006/0155018 | A1 | 7/2006 | Metzemacher et al. |
| 2007/0043155 | A1 | 2/2007 | Pees |

FOREIGN PATENT DOCUMENTS

| JP | 56-20042 | 2/1981 |
| WO | WO 2007/074262 A1 | 7/2007 |

OTHER PUBLICATIONS

M. Valera-Zaragoza, E. Ramirew-Vargas, F.J. Medeliin-Rodriguez, B.M. Huerta-Martinez, "Thermal stability and flammability properties of heterophasic PP-EP/EVA/organoclay nanocomposites." Oct. 10, 2005, pp. 1319-1325.*

M. Valera-Zaragoza, E. Ramirez-Varga, F.J. Medellin-Rodriguez, B.M Huerta-Martinez, "Thermal stability and flammability properties of heterophasic PP-Ep/EVA/organoclay nanocomposites." Oct. 10, 2005, pp. 1319-1325.*

Shi., Synthesis and characterization of poly(vinyl acetate) and ethylene-vinylacetate silicate nanocomposites.*

Shi, Y., et al., "Surfactant-Free Method for the Synthesis of Poly(vinyl acetate) Masterbatch Nanocomposites as a Route to Ethylene Vinyl Acetate/Silicate Nanocomposites", Chem. Mater. 19(7), pp. 1552-1564, 2007—Supporting Information.

Alexandre, M., et al., "Preparation and Properties of Layered Silicate Nanocomposites Based on Ethylene Vinyl Acetate Copolymers", Macromol. Rapid Commun. 22, pp. 643-646, 2001.

Yosuke, N., et al., "Ethylene-Vinyl Acetate Copolymer Composition for Agricultural Covering Film and Film Comprising the Same", Patent Abstracts of Japan, Publication No. 2005-344069, Dec. 15, 2005.

* cited by examiner

*Primary Examiner* — Rabon Sergent
*Assistant Examiner* — Deve Valdez
(74) *Attorney, Agent, or Firm* — Hodgson Russ LLP

(57) ABSTRACT

Solution blending of masterbatch of cationically functionalized polyvinyl acetate copolymer/silicate nanocomposite where the silicate is substantially exfoliated, and ethylene-vinyl acetate copolymer (EVA), produces product of increased tensile strength and Young's Modulus compared to neat EVA and reduced flammability compared to neat EVA. The product can be injection molded or compression molded or extruded without loss of these advantages.

20 Claims, 12 Drawing Sheets

The XRD patterns of PVAc/MMT hybrids containing about 5-6% clay

The XRD patterns of PVAc/MMT hybrids containing about 9-14% clay

The XRD patterns of PVAc/MMT hybrids containing about 21-25% clay

STEM image of PVAc-10, intercalated

STEM image of PVAc-A10, intercalated/exfoliated nanocomposite

Low magnification TEM image of PVAc-B10, mostly exfoliated nanocomposite

The XRD patterns of pristine MMT and EVA/MMT nanocomposites. From bottom to top: 1, EVA-NC1; 2, EVA-NC2; 3, EVA-NC5; 4, EVA-1; 5, EVA-2; 6, EVA-5; 7, pristine MMT.

Low magnification TEM image of EVA-5, intercalated nanocomposite

Low magnification TEM image of EVA-NC5, intercalated/exfoliated nanocomposite

Pictures of EVA and its nanocomposites. (A) EVA, (B) EVA-1, (C) EVA-NC1, (D) EVA-2 and (E) EVA-NC2

TGA of EVA and EVA-NC1, -NC2, and -NC5 under nitrogen.

TGA of EVA and EVA-NC1, -NC2 and –NC5 in air.

Tan δ of EVA and EVA/MMT nanocomposites (EVA-5 and EVA-NC5)

Storage moduli of EVA and its nanocomposites.

Storage moduli of EVA-NC 1, 2, 5 varying with MMT content at different temperature.

Storage moduli of EVA nanocomposites containing 6.4% clay and corresponding EVA/PVAc blends. EVA: solid line (a); EVA-0: dashed line (b); EVA-5: dotted line (c); EVA-NC0, dash-dotted line (d); EVA-NC5, solid line (e)

Heat release rate versus temperature of EVA and EVA nanocomposites

Tan δ of EVA and EVA/silicate nanocomposites EVA-5 and EVA-NC5.

Storage modulus versus temperature plots for EVA and its nanocomposites.

Storage moduli versus MMT content for EVA-NC0, -NC1, -NC2, and –NC5 (solid lines) and EVA-0, EVA-1, EVA-2, and EVA-3 (dotted lines) at different temperatures.

Storage modulus versus temperatures plots for EVA/silicate nanocomposites and EVA/PVAc blends.

US 7,947,774 B2

ETHYLENE-VINYL ACETATE COPOLYMER OF INCREASED MECHANICAL PROPERTIES

RELATED APPLICATIONS

This application claims a benefit of priority to U.S. Provisional Application No. 60/852,962, filed Oct. 20, 2006, the whole of which is herein incorporated by reference.

This invention was made at least in part with Government support under National Science Foundation Grant Number DMF-0079992 and using facilities supported by National Science Foundation Grant Number DMR-9632275 and equipment purchased through National Science Foundation Grant Number DMR-8314255.

TECHNICAL FIELD

This invention is directed to ethylene-vinyl acetate (EVA) nanocomposite with improved mechanical properties and processability. More specifically, this invention is directed to an EVA nanocomposite comprising EVA and poly(vinyl acetate)/silicate nanocomposite.

BACKGROUND OF THE INVENTION

EVA represents one of the most important types of ethylene copolymers. EVA is used in wide range of applications, including packaging, hose and tubing, footwear, melt adhesives, cable and wire insulation, etc. In these applications, it is desirable for the EVA to have a high level of fire retardancy and excellent strength.

In the past, EVA has been combined with other materials to form EVA nanocomposites. EVA in the form of a silicate-containing nanocomposite has been preferred to impart increased strength and fire retardancy compared to neat EVA. Most EVA/silicate nanocomposites reported previous to the invention herein were prepared by melt intercalation of organically modified silicate with EVA or solution intercalation of organically modified silicate into EVA. However, the organic modifier of these EVA nanocomposites is subject to decomposition and/or volatilization, which may then lead to the collapse of the interlayer of the silicate and reduced mechanical stability of the nanocomposite.

Additionally, while the addition of silicate to EVA via, for example, intercalation, tends to improve the mechanical properties of the EVA nanocomposite, such methods also impair the toughness of the EVA nanocomposite.

Furthermore, when silicate is intercalated in a polymer as described in previous methods, the advantages of introducing the silicate into the polymer may be lost upon further processing of the composite material. Silicate is initially present as attached spaced plates or layers of silicate. During intercalation, polymer is inserted in the spaces or galleries of the silicate and the overall spaced plate arrangement of the silicate is preserved. The resultant structure is therefore a silicate structure with polymer in interspaces of a coherent silicate structure. Upon further processing of the composite material, such as melt processing, the polymer may migrate out of the interspaces of the silicate, thereby diminishing the benefit of adding silicate in the first place.

Accordingly, it is desirable to provide a method of making an EVA nanocomposite that improves the mechanical properties of the EVA nanocomposite without impairing toughness and to provide an EVA nanocomposite with substantially exfoliated silicate in a polymer phase, which can in turn be heat processed without losing exfoliation.

SUMMARY OF THE INVENTION

It has been discovered herein that the decomposition/volatility problem associated with prior compositions is avoided by forming the EVA nanocomposites by solution blending EVA with a masterbatch of cationic poly(vinyl acetate) copolymer/silicate nanocomposite where the silicate is substantially exfoliated. It has also been discovered that an EVA nanocomposite comprising the PVAc/silicate nanocomposite possesses substantially exfoliated silicate in a EVA phase, which has improved mechanical characteristics and can be heat processed without losing exfoliation.

In particular, one embodiment herein, denoted the first embodiment, is directed at a method for imparting increased mechanical properties to EVA copolymer without impairing toughness, comprising the step of solution blending EVA and poly(vinyl acetate)/silicate nanocomposite where the PVAc is cationically functionalized PVAc having $M_n$ ranging from 10,000 to 100,000 grams/mol, the cationically functionalized PVAc contains from 99.8 to 95 mol % vinyl acetate units and from 0.2 to 5 mol % cationically functionalized acrylate units and the silicate content of the PVAc/silicate nanocomposite is substantially exfoliated and ranges from 2 to 25 wt % of the PVAc/silicate nanocomposite.

In an aspect of the first embodiment, the EVA has a melt index ranging from 25 g/10 minutes to 500 g/10 minutes (measured by ASTM D1238) and vinyl acetate content ranging from 20 to 50 wt % of the EVA. In another aspect of the first embodiment, the components of the EVA nanocomposite are added in proportions such that the substantially exfoliated silicate is present in the EVA nanocomposite in an amount ranging from 0.5 to 10 wt % of the EVA nanocomposite.

Another embodiment herein, denoted the second embodiment, is directed to an EVA nanocomposite comprising EVA and from 4 to 20 wt % of a polymer miscible with EVA and from 0.5 to 10 wt % silicate which is substantially exfoliated.

Still another embodiment herein, denoted the third embodiment, is directed to a method for producing a solid thermoplastic part where the silicate in said part is substantially exfoliated and ranges from 0.5 to 10 wt % of the part, comprising melting the EVA nanocomposite of the second embodiment, injecting the melted EVA nanocomposite into a mold or extruding it through a die and solidifying the injection molded or extruded melted EVA nanocomposite, or compression molding the EVA nanocomposite of the second embodiment.

As used herein, the term "substantially exfoliated" means that at least 90% of the silicate is exfoliated; i.e., in delaminated form.

Molecular weights were determined with respect to polystyrene standards by size exclusion chromatography (SEC) in tetrahydrofuran (THF) using a Waters HPLC with ultrastyragel (Waters Associates) columns and a refractive index detector.

DETAILED DESCRIPTION

Figure 1:
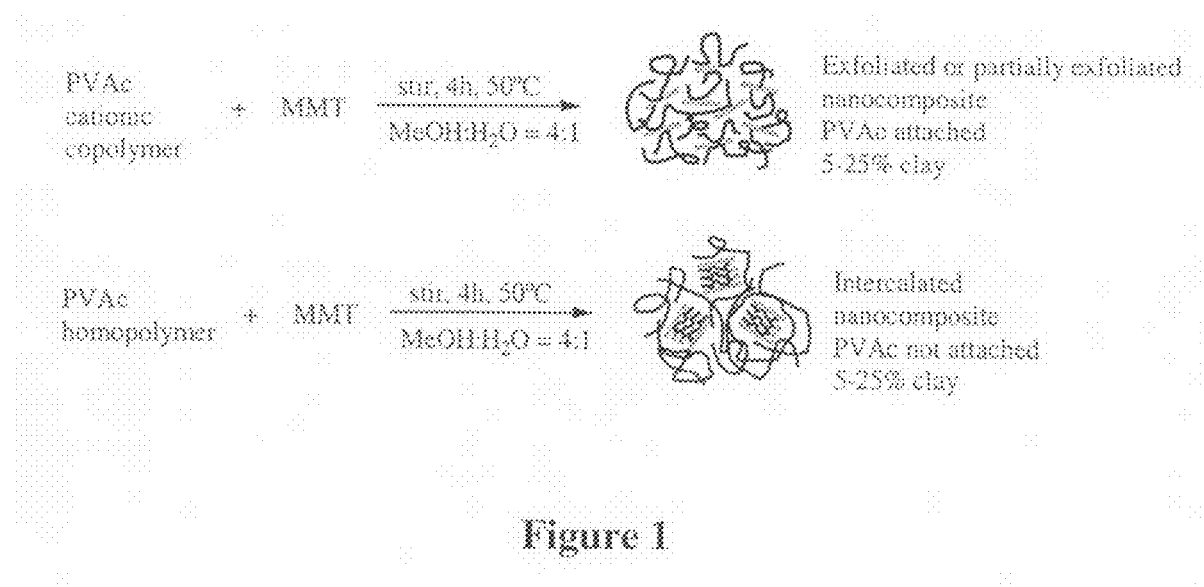
FIG. 1 depicts the synthesis and resultant structure of the mixture of PVAc and cationically charged PVAc with MMT.

We turn now to the first embodiment herein.

The method of imparting increased mechanical properties to EVA copolymer without impairing toughness utilizes two main components. The two main components are PVAc/silicate nanocomposite and EVA.

The PVAc/silicate nanocomposite component comprises two components and is prepared prior to performing the steps of the inventive method described herein. The two components are PVAc and silicate.

The PVAc component is preferably cationic. The cationic PVAc for the PVAc/silicate nanocomposite can be prepared by copolymerizing vinyl acetate and vinyl containing quaternary ammonium compound. Vinyl acetate and vinyl containing quaternary ammonium compound are dissolved in solvent, e.g., methanol, in the presence of 2,2'-azobisisobutyronitrile (AIBN) initiator or 2,2'-azo-bis(2,3-dimethylvaleronitrile) (ADMVN) initiator or any other suitable initiating agent at, e.g., 40 to 60° C. Suitable quaternary ammonium compounds include, for example, (dimethylamino)ethyl acrylate methyl chloride quaternary ammonium salt (DMAEAQ), which is available from Aldrich and which was used for experiments discussed herein.

A reaction equation for vinyl acetate and DMAEAQ (also know as 2-acryloxyethyl)trimethylammonium chloride or AETMC) is as follows:

The cationically functionalized PVAc preferably has a $M_n$ ranging from 10,000 to 100,000 grams/mol, contains 99.8 to 95 mol % vinyl acrylate units and from from 0.2 to 5 mol % cationically functionalized acrylate units.

The silicate referred to is that of a nanoclay. The nanoclay is preferably montmorillonite (MMT), a naturally occurring nanoclay. Other useful nanoclays include, for example, fluorohectorite, laponite, bentonites, beidellites, hectorites, saponites, nontronites, sauconites, vermiculites, ledikites, nagadiites, kenyaites and stevensites.

The nanoclay used for experimentation herein was Cloisite® Na+ obtained from Southern Clay Products, Inc., Texas. It is described as a natural montmorillonite and has a dry particle size of 90% less than 13 microns.

The preparation of PVAc/silicate nanocomposite is accomplished by solution blending. A typical procedure involves dissolving cationic PVAc in methanol and then slowly adding silicate dispersed in water to the methanol solution of the polymer. This forms a homogenous dispersion, which is continuously stirred for a period of time at an elevated temperature (e.g., 4 hours at 50° C.). The methanol is then removed under vacuum and the PVAc/silicate nanocomposite is precipitated from the water as a white powder. The product is filtered and dried.

As a result of the above steps, the silicate content of the PVAc/silicate nanocomposite is substantially exfoliated, i.e., at least 90% of the silicate is exfoliated (in delaminated form). The extent of exfoliation depends on the silicate loading and the milliequivalents (mEq) of cationic sites, i.e., more cationic sites support more silicate loading for exfoliation results.

The silicate surface is negatively charged, and therefore there is an interaction between the silicate and the cationically charged PVAc polymer which keeps the silicate bound to the PVAc polymer. This interaction is best described as an electrostatic interaction. The electrostatic interaction binds the PVAc polymer to the surface of the silicate and therefore helps to maintain exfoliation. When PVAc is not cationically charged, the electrostatic interaction does not exist and therefore the silicate particles are only partially exfoliated.

The silicate content of the PVAc/silicate nanocomposite is preferably 2 to 25 wt % of the PVAc/silicate nanocomposite.

The PVAc/silicate is appropriately referred to as a masterbatch. The term "masterbatch" is used herein to mean a first polymer(s) containing a higher concentration of additive than is to be obtained in a blend of a different polymer, for blending with the different polymer.

The EVA component of the EVA nanocomposite is commercially available and is prepared by copolymerization of ethylene and vinyl acetate. Vinyl acetate is synthesized by oxyacetylation of ethylene with acetic acid and oxygen. The EVA preferably has a vinyl acetate content ranging from 20 to 50 wt % of the EVA and has a melt index ranging from 25 g/10 minutes to 500 g/10 minutes.

The EVA and PVAc/silicate nanocomposite are solution blended. The solution blending of EVA and cationically functionalized PVAc/silicate nanocomposite is readily carried out by dispersing a masterbatch of cationically functionalized PVAc/silicate nanocomposite in a flask of tetrahydrofuran (THF), dissolving EVA in a second flask, adding the contents of the second flask to first flask and heating, e.g., at 50° C., and maintaining this temperature while stirring for, e.g., 2-10 hours, then cooling and evaporating to dryness.

In a preferred aspect, the solution is blended such as to provide in the EVA nanocomposite a silicate content of from 4 to 6 wt %.

The mechanical properties improved by the method disclosed herein include the tensile strength and Young's Modulus. Mechanical properties for the EVA nanocomposite showed tensile strength (at yield) increase of more than 1.10 times, particularly a 16-98% increase, as compared to that of EVA before blending, Young's Modulus increase of more than 1.40 times, particularly a 41-193% increase, as compared to that of EVA before blending, and less than 25% decrease in toughness, particularly a 21% decrease in toughness, as compared to EVA before blending.

Tensile strength, Young's Modulus, and toughness are measured using an Instron at crosshead speed 5 mm/min.

In general, the EVA nanocomposites resulting from the inventive method also show increased storage modulus compared to neat EVA as measured by Dynamic Mechanical Analysis (DMA).

EVA nanocomposite with increased fire retardancy is also obtained by the method herein as determined by measuring heat release rates. The increased fire retardancy is exhibited by a 24 to 28% decrease in peak heat release rate and a 10% decrease in the total heat releases when the silicate content of the EVA blend is from 4 to 6 wt %, and preferably 5.6 wt %.

We turn now to the second embodiment herein.

The second embodiment is directed to an EVA nanocomposite comprising EVA, from 4 to 20 wt % polymer miscible in EVA and from 0.5 to 10 wt % silicate where the silicate is substantially exfoliated.

The EVA is as described in the first embodiment.

Polymers miscible with EVA include, for example, PVAc, polyethylene, polypropylene, poly(vinyl acetate), cellulose acetate butyrate, poly(vinyl chloride), etc.

The blend of the second embodiment preferably comprises EVA and PVAc/silicate nanocomposite where the silicate content of the PVAc/silicate nanocomposite is substantially exfoliated and ranges from 2 to 25 wt % of said nanocomposite. Preferably the PVAc is cationically functionalized PVAc having $M_n$ ranging from 10,000 to 100,000 grams/mol and contains from 99.8 to 95 mol % vinyl acetate units and from 0.2 to 5 mol % cationically functionalized acrylate units. The EVA preferably has a melt index ranging from 25 g/10 minutes to 500 g/10 minutes (measured by ASTM 1238) and vinyl acetate content ranging from 20 to 50 wt % percent. It is also preferable that the EVA and PVAc/silicate nanocomposite are present in proportions such that the substantially exfoliated silicate amounts to 0.5 to 10 wt % of the EVA nanocomposite and the poly(vinyl acetate) content added because of the PVAc/silicate nanocomposite ranges from 4 wt % to 20 wt % of the EVA nanocomposite.

In the case of the EVA nanocomposite as described above, the EVA nanocomposite has tensile strength of 1.21 times and Young's modulus of 1.87 times that of neat EVA.

In a case where the EVA nanocomposite comprises 4 to 6 wt % exfoliated silicate, the flammability of the blend is reduced compared to neat EVA.

Turning now to the third embodiment, a method of injection molding, extrusion or compression molding EVA nanocomposite to produce a solid thermoplastic/silicate nanocomposite part is disclosed. The method comprises melting the EVA nanocomposite of the second embodiment, and subjecting the melted EVA nanocomposite to injection molding, extrusion or compression molding. Any injection molding, extrusion or compression molding procedure known to one of ordinary skill in the art may be used. After the EVA nanocomposite is injection molded, extruded or compression molded, the EVA nanocomposite is allowed to solidify to form a thermoplastic/silicate nanocomposite part.

Thermoplastic/silicate nanocomposite parts formed by the method described above were found to be similar to neat EVA in optical clarity and homogeneity, whereas injection molded samples prepared from intercalated nanocomposites showed silicate particulates.

The above described invention is illustrated by the following examples.

Example I

Production of EVA Nanocomposite Using DMAEAQ as Quaternary Ammonium Compound

Copolymerization of Vinyl Acetate with DMAEAQ

Cationically functionalized PVAc was produced using varying amounts of DMAEAQ.

Sample 1: PVAc-A

To a three-neck round bottom flask equipped with a mechanical stirring bar were added distilled vinyl acetate (100 g, 1.16 mol), DMAEAQ (0.06 g, 0.31 mmol) and degassed methanol (26 g, 813 mmol). Nitrogen was passed through the mixture for 30 min with stirring before AIBN initiator (0.96 g, 5.82 mmol) was added. 14 mL of methanol solution of DMAEAQ (1 g, 5.2 mmol) were added continuously through an addition funnel throughout the polymerization. The polymerization was carried out at 60° C. for 1.5 h at a stirring speed of 100 rpm. The solution turned viscous and a little cloudy. The polymer was purified by precipitation from acetone/hexanes once and from methanol/cold water twice. The product was filtered and dried in vacuum oven at 50° C. overnight. The molar ratio of the monomers to the initiator was 200:1. Yield was 32 g (32%). Composition of the copolymers was measured using $^1$H NMR: DMAEAQ Found 0.37 mol %, expected 0.45 mol %. GPC: $M_n$ 63,000 $M_w$ 130.000.

Sample 2: PVAc-B

PVAc-B was prepared in a similar manner using vinyl acetate (100 g, 1.16 mol), DMAEAQ (0.48 g, 2 mmol followed by 8 g, 41 mmol), methanol (26 g, 813 mmol followed by 11 g, 344 mmol), and AIBN (0.96 g, 5.82 mmol). Yield was 30 g (28%). Composition: DMAEAQ Found 1 mol %, expected 3.6 mol %. GPC: $M_n$ 57,000 $M_w$ 102,000.

Control Sample: PVAc

PVAc was prepared by polymerization of vinyl acetate (100 g, 1.16 mol) using a similar procedure without addition of DMAEAQ. Yield: 50 g (50%). GPC: $M_n$ 54,000 $M_w$ 129,000.

Sample 3: PVAc-C

PVAc-C was prepared by a slightly different procedure as described below. To a three-neck round bottom flask equipped with a mechanical stirring bar were added distilled vinyl acetate (100 g, 1.16 mol), DMAEAQ (0.96 g, 5 mmol) and degassed methanol (52 g, 1.63 mol). Nitrogen was passed through the mixture for 30 min with stirring before AIBN (0.96 g, 5.82 mmol) was added. 28 mL of methanol solution of DMAEAQ (16 g, 82 mmol) were added continuously through a syringe pump at a rate of 0.2 mL/min over 3 h. The polymerization was carried out at 60° C. for 4 h at a stirring speed of 100 rpm. The solution turned viscous and a little cloudy. The polymer was purified by precipitation from acetone/hexanes once and from methanol/water twice. The product did not precipitate from cold water but formed a white sticky suspension. It was centrifuged at 7000 rpm for 30 min to separate the polymer from water, followed by drying under vacuum at 50° C. overnight. The molar ratio of the monomers to the initiator was 200:1. Yield: 59 g (51%). Composition of the copolymers measured using $^1$H NMR: DMAEAQ Found 2.14 mol %, expected 7.2 mol %. GPC: $M_n$ 21,000 $M_w$ 66,000.

The cationic modified PVAc in the above Samples was precipitated from cold methanol/water twice to remove traces of unreacted monomers and DMAEAQ homopolymer. As the DMAEAQ content increased, the cationic copolymer became more and more water-soluble. For example, PVAc homopolymer and PVAc-A (0.37 mol % DMAEAQ) tended to precipitate very easily from water. PVAc-B (1 mol % DMAEAQ) formed soft, sticky white solid, but could still be separated from water by filtration. However, PVAc-C existed as a homogeneous suspension in water, which could only be separated by centrifuge.

TABLE 1

Copolymer compositions obtained by $^1$H NMR for Experiment I

| Samples | Comonomer | DMAEAQ (mol %, feed)[a] | DMAEAQ (mol %, obsd)[b] | $M_w$ ($\times 10^{-3}$)[c] | $M_n$ ($\times 10^{-3}$)[c] |
|---|---|---|---|---|---|
| PVAc | N/A[d] | 0 | 0 | 129 | 54 |
| PVAc-A | DMAEAQ | 0.45 | 0.37 | 130 | 63 |
| PVAc-B | DMAEAQ | 3.60 | 1.00 | 102 | 57 |
| PVAc-C | DMAEAQ | 7.20 | 2.14 | 66 | 21 |

[a]Relative amount of cationic monomer in the feed in mol %.
[b]Observed relative amount of cationic monomer in the copolymer in mol % measured by 1H NMR.
[c]Molecular weights determined by SEC with respect to polystyrene standard.
[d]Not applicable.

Production of PVAc/Silicate Nanocomposite

PVAc/silicate nanocomposites using 5, 10 and 20 wt % silicate were prepared. A typical procedure using 20 wt % silicate follows:

Sample 1: PVAc-A20

In 600 mL of methanol was dissolved PVAc-A (12 g, DMAEAQ content 0.37%). Silicate (3 g) dispersed in 150 mL of water was added slowly to the methanol solution of the polymer to form a homogeneous dispersion, which was stirred at 50° C. for 4 h. Methanol was removed under vacuum and the nanocomposite was precipitated from water as a white powder. The product was filtered and dried in a vacuum oven at 50° C. overnight. Yield: 11.9 g (79%). TGA: Found % clay 20.5 wt %, expected 20 wt %. $T_d$ 306° C. XRD: d-spacing 2.0 nm.

A similar procedure was applied to the preparation of nanocomposites PVAc-A05 and PVAc-A10 on a smaller scale (~1 g). The concentration of silicate dispersion in water was kept at 2 wt % and the volume ratio of methanol to water remained as 4:1.

Sample 2: PVAc-A05

A dispersion of silicate (0.05 g) in 2.5 mL of water was added to 0.95 g of PVAc-A in 10 mL of methanol. Yield: 0.65 g (65%). TGA: Found % clay 5.3 wt %, expected 5 wt %. $T_d$ 309° C. XRD: no peak, suggesting exfoliated structure.

Sample 3: PVAc-A10

A dispersion of silicate (0.10 g) in 5 mL of water was added to 0.90 g of PVAc-A in 20 mL of methanol. Yield: 0.82 g (82%). TGA: Found % clay 9.1 wt %, expected 10 wt %. $T_d$ 309° C. XRD: a broad shoulder suggesting the presence of some intercalated structure.

Additional samples were prepared using the procedure for PVAc-A05, PVAc-A10 and PVAc-A20, respectively, by replacing PVAc-A (DMAEAQ content 0.37%) with PVAc-B (DMAEAQ content 1%).

Sample 4: PVAc-B05

Yield: 0.64 g (64%). TGA: Found % clay 5.9 wt %, expected 5 wt %. $T_d$ 313° C. XRD: no peak.

Sample 5: PVAc-B10

Yield: 0.64 g (64%). TGA: Found % clay 11.8 wt %, expected 10 wt %. $T_d$ 306° C. XRD: no peak.

Sample 6: PVAc-B20

Yield: 13 g (87%). TGA: Found % clay 21.9 wt %, expected 20 wt %. $T_d$ 303° C. XRD: d-spacing 2.0 nm.

Sample 7: PVAc-C20

PVAc-C20 was prepared following the same procedure for PVAc-A20, using PVAc-C in place of PVAc-A. The reaction scale (50 g) was 3.33 times that for PVAc-A20 preparation. Yield: 47 g (94%). TGA: Found % clay 24.9 wt %, expected 20 wt %. $T_d$ 309° C. XRD: no peak, suggesting exfoliated structure.

Still more samples were prepared using the procedures for PVAc-A05, PVAc-A10 and PVAc-A20, respectively, by replacing PVAc-A (DMAEAQ content 0.37%) with PVAc homopolymer.

Control Sample 1: PVAc-05

Yield: 0.75 (75%). TGA: Found % clay 5.8 wt %, expected 5 wt %. $T_d$ 315° C. XRD: small peak.

Control Sample 2: PVAc-10

Yield: 0.76 g (76%). TGA: Found % clay 13.7 wt %, expected 10 wt %. $T_d$ 309° C. XRD: d-spacing 2.1 nm.

Control Sample 3: PVAc-20

Yield: 12.3 g (82%). TGA: Found % clay 24.4 wt %, expected 20 wt %. $T_d$ 305° C. XRD: d-spacing 2.1 nm.

FIG. 1 illustrates the difference in structure between a reaction of cationically functionalized PVAc and silicate and a reaction of PVAc homopolymer and silicate. The cationically functionalized PVAc results in an exfoliated or partially exfoliated state with attached PVAc, whereas the PVAc homopolymer results in a intercalated nanocomposite with unattached PVAc.

The effect of cationic incorporation on the nanostructure of the nanocomposites was investigated. Table 2 below summarizes the compositions of the nanocomposites together with TGA and XRD characterization results and illustrates exfoliation when there is cationic incorporation.

TABLE 2

Characteristics of masterbatch nanocomposites of vinyl acetate polymers for Experiment I

| Nano-composite Designation | Source of Polymer Component | MMT (wt %) (calc) | MMT (wt %) (TGA) | $T_d$ (°C.) | d-spacing (nm) (XRD) |
|---|---|---|---|---|---|
| PVAc-05 | PVAc | 5 | 5.8 | 315 | Broad, very small |
| PVAc-10 | PVAc | 10 | 13.7 | 309 | 2.1 |
| PVAc-20 | PVAc | 20 | 24.4 | 305 | 2.1 |
| PVAc-A05 | PVAc-A | 5 | 5.3 | 309 | No peak Broad shoulder, |
| PVAc-A10 | PVAc-A | 10 | 9.1 | 309 | very small |
| PVAc-A20 | PVAc-A | 20 | 20.5 | 306 | 2.0 |
| PVAc-B05 | PVAc-B | 5 | 5.9 | 313 | No peak |
| PVAc-B10 | PVAc-B | 10 | 11.8 | 306 | No peak |
| PVAc-B20 | PVAc-B | 20 | 21.9 | 303 | Broad |
| PVAc-C20 | PVAc-C | 20 | 24.9 | 301 | No peak |

Figure 2:
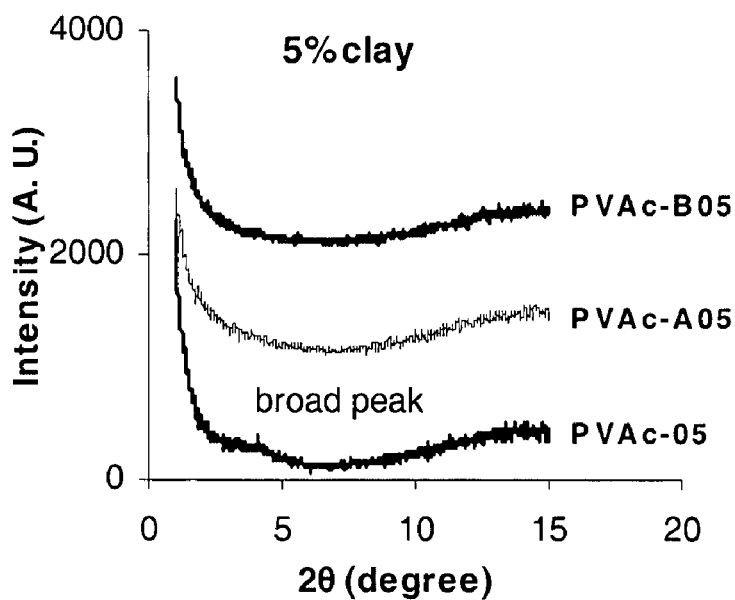
FIG. 2 is a graph of the XRD patterns of PVAc/MMT hybrids containing about 5-6% clay.

FIG. 2 presents the XRD patterns of the PVAc/MMT nanocomposites containing about 5-6% clay. The XRD plot for the nanocomposite from PVAc homopolymer (PVAc-05) clearly showed a diffraction peak at around 4.1° due to the 001 basal reflection, indicating an intercalated structure with a d-spacing of 2.1 nm. On the contrary, the absence of any diffraction peak in the XRD curves of the nanocomposites containing cationic copolymers (PVAc-A05 and PVAc-B05) suggested exfoliation of the clay layers.

Figure 3:
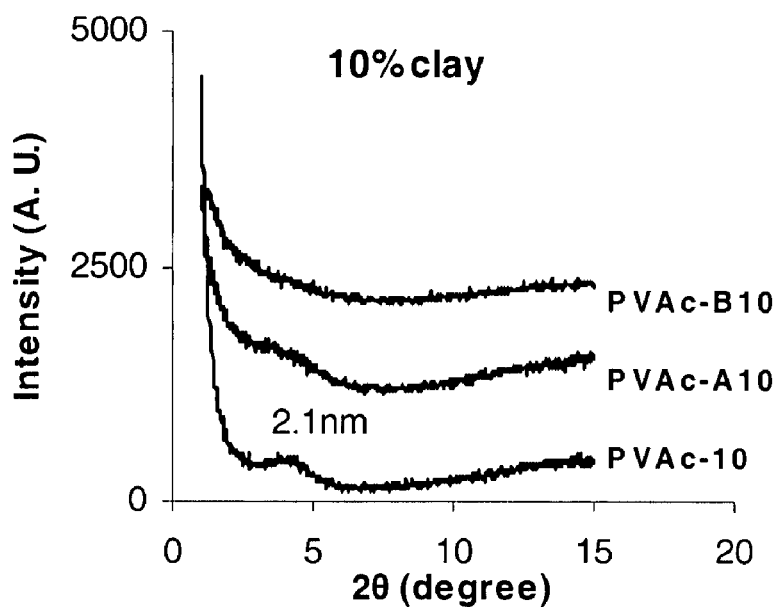
FIG. 3 is a graph of the XRD patterns of PVAc/MMT hybrids containing about 9-14% clay.

As shown in FIG. 3, when the clay content was raised to 9-14%, the nanocomposite from the copolymer containing 0.37% cationic moiety (PVAc-A10) showed a very broad but small shoulder between 30 to 5°, while that from the copolymer containing 1% cationic moiety (PVAc-B10) showed no peak in the XRD plots. As expected the nanocomposite from PVAc (no cationic comonomer, PVAc-10) showed a peak with a d-spacing of 2.1 nm.

Figure 4:
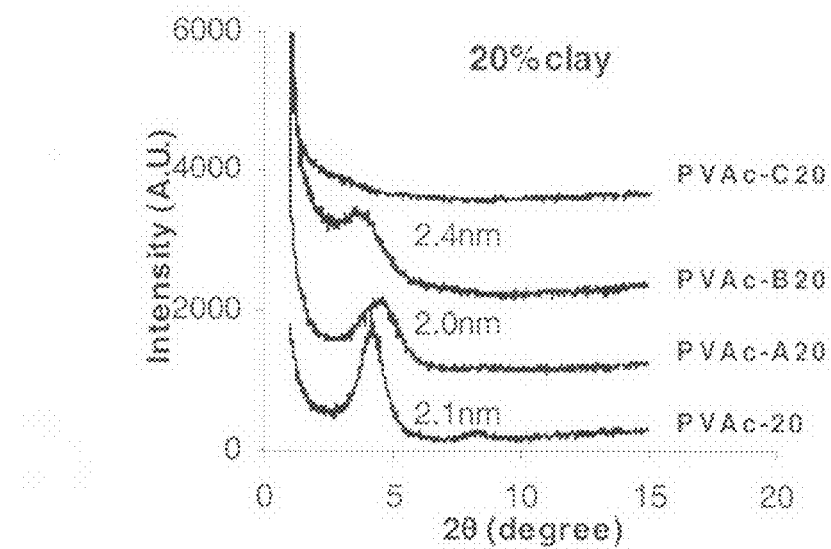
FIG. 4 is a graph of the XRD patterns of PVAc/MMT hybrids containing about 21-25% clay.

As shown in FIG. 4, when clay content was increased further to 20-24%, sharper peaks at 4.4° for were observed for both PVAc-20 and PVAc-A20. In the case of homopolymer nanocomposite (PVAc-20), reappearance of the original montmorillonite peak occurred at 8.3°. The reappearance of original MMT peak suggests the presence of original clay bundles from non-dispersed clay platelets.

In the XRD of the nanocomposite containing higher cationic moiety (PVAc-B20, 1 mol % DMAEAQ) a broad peak appeared at 4°, but the reappearance of original MMT was not observed. In the case of the nanocomposite containing the highest cationic moiety (PVAc-C20, 2.14 mol % DMAEAQ), the XRD peak completely disappeared, indicating the possibility of fully exfoliated structure. The differences in the XRD patterns could be explained by the fact that in the nanocomposites containing no cationic comonomer (PVAc-05, -10, and -20), the PVAc homopolymer chains interacted with the clay layers via mainly van der Waals forces while in the nanocomposites containing cationic units (PVAc-A, PVAc-B and PVAc-C series) the copolymers were attached to the clay layers by much stronger electrostatic interactions. Based on the XRD results it is reasonable to conclude that incorporation of cationic sites into PVAc facilitated interactions of the polymer chains with the clay surface, thereby leading to better exfoliation. The higher the cationic content was the higher the extent of exfoliation.

Although XRD is a powerful method for characterizing the structure of nanocomposites, the mere absence of peaks in the pattern is not sufficient to draw conclusive inferences regarding extent of exfoliation. Corroborative evidence from other sources such as TEM is necessary. Hence, in order to shed more light on the above XRD results, STEM and TEM were performed on nanocomposites containing about 10% clay (STEM for PVAc-10 and PVAc-A10 and TEM for PVAc-B10) as representative examples and compared the results with the XRD data (FIG. 3).

Figure 5:
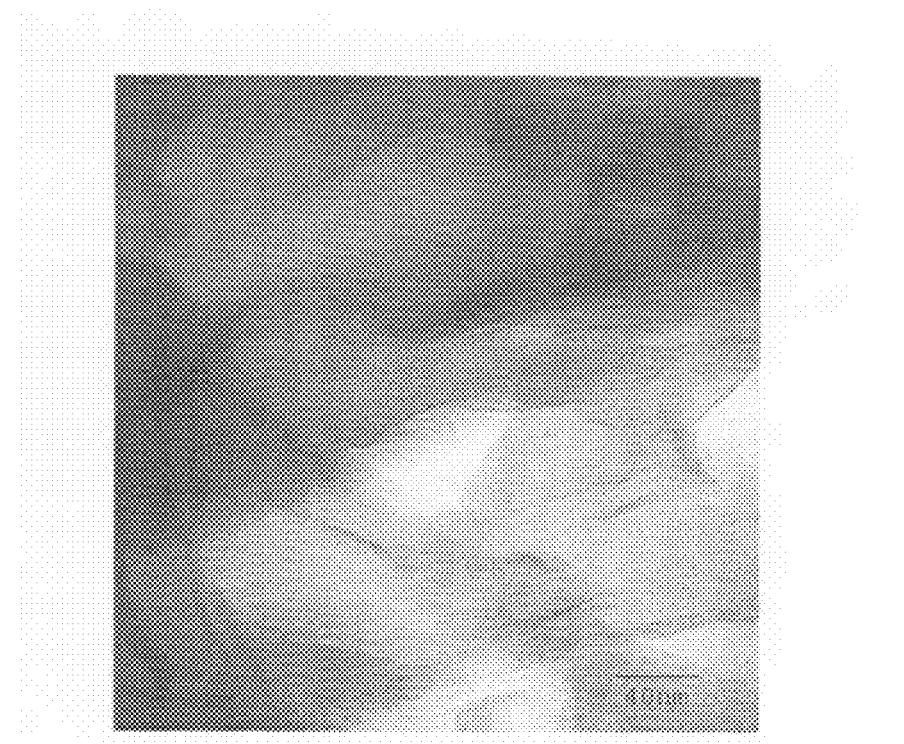
FIG. 5 is a STEM image of intercalated PVAc-10.

As seen in FIG. 5, the STEM image of PVAc-10 showed large clay stacks, which might be responsible for the X-ray diffraction peak at 4.2° (FIG. 3). Obviously, the non-functionalized PVAc homopolymer was hydrophilic enough to have some compatibility with the pristine montmorillonite, leading to an intercalated structure instead of a microcomposite. The interactions between the clay and the polar ester groups along the PVAc homopolymer chain permitted one or two layers of polymer chains to be incorporated into the hydrophilic clay intergalleries although it did not contain the cationic attachment sites.

Figure 6:
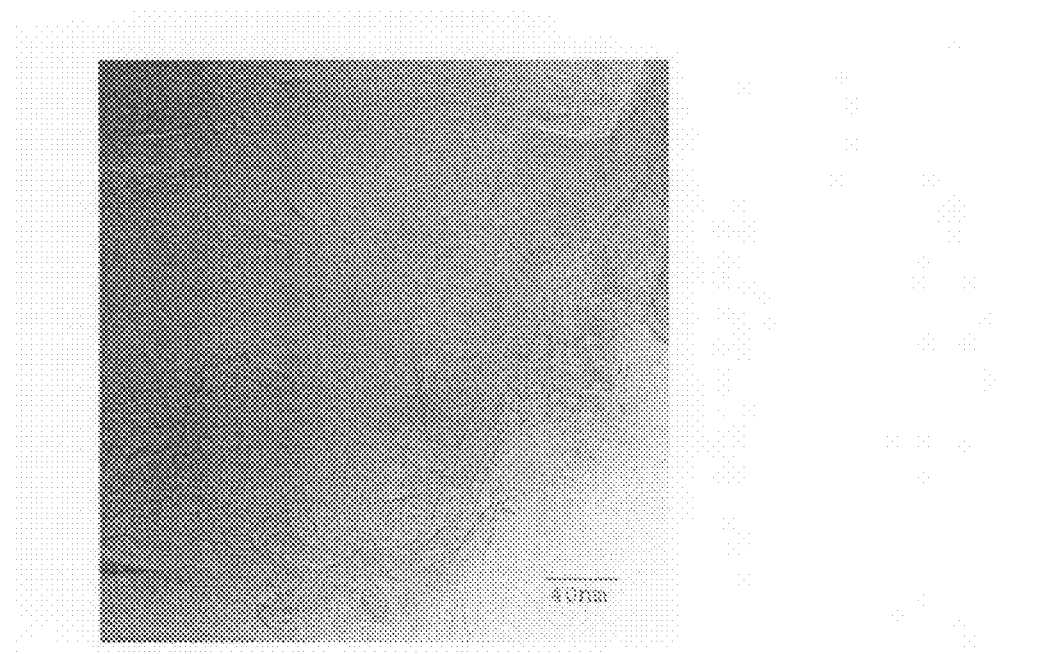
FIG. 6 is a STEM image of intercalated/exfoliated PVAc-A10.

As seen in FIG. 6, the STEM image of the nanocomposite containing 0.37% cationic moiety (PVAc-A10) showed single clay platelets, which is consistent with exfoliation. The broad XRD peak in the PVAc-A10 XRD curve (FIG. 3) could be attributed to a small amount of stacked clay layers although these could not be readily discerned from the STEM image.

Figure 7:
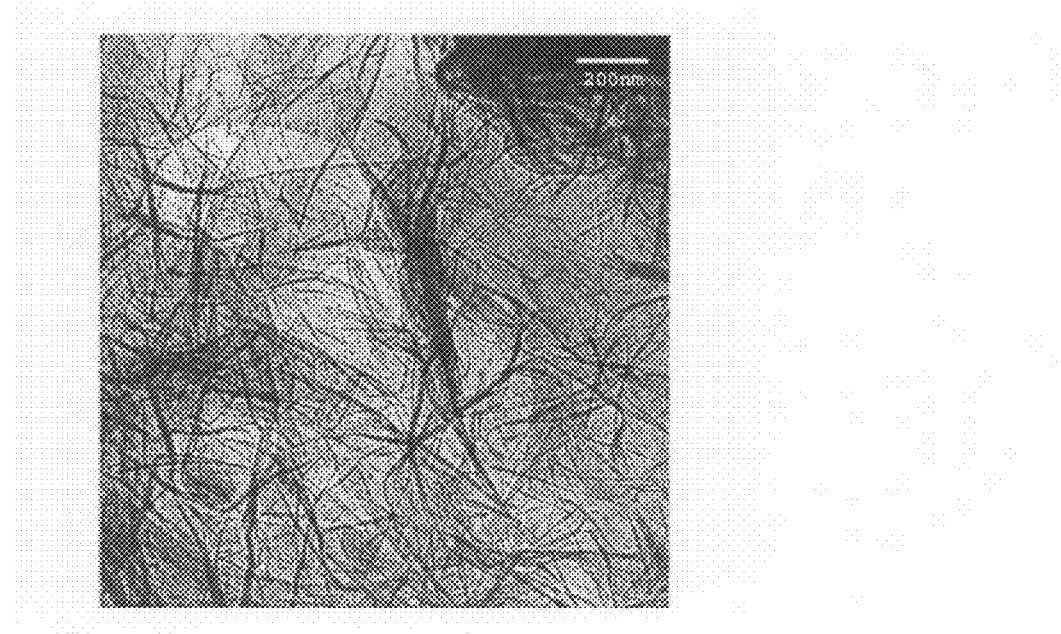
FIG. 7 is a low magnification TEM image of mostly exfoliated PVAc-B10.

FIG. 7 shows the low magnification TEM image of PVAc-B10, the nanocomposite with the higher cationic moiety. Clearly, the original stacked clay layers were exfoliated into single (or, at most, double) clay layers uniformly distributed within the polymer matrix. The dark area in the center of the image that looked like aggregates of clay could have been caused by the non-uniform thickness of the TEM specimen. Overall, evidence for exfoliated morphology is overwhelming in PVAc-B10, which is consistent with its XRD curve in FIG. 3. Hence, both XRD and microscopy results indicated that incorporation of cationic moiety into the polymer made it possible for the polymer to become attached to the clay surface and facilitated exfoliation.

Solution Blending of EVA Nanocomposite

EVA/silicate nanocomposites containing 0.8, 2.1, and 5.6 wt % clay were prepared by solution blending of EVA with PVAc-B20 masterbatch. A typical procedure for 5.6 wt % Silicate/EVA nanocomposite (EVA-NC5) is described below.

Sample 1: EVA-NC5

EVA (15 g) was dissolved in THF (100 mL). PVAc-B20 (5 g) was dispersed in THF (250 mL) by stirring overnight and sonication for 1 h. The PVAc-B20 dispersion was then mixed with the EVA solution and the mixture stirred at 50° C. for 4 h. THF was removed under vacuum and the resulting nanocomposite was dried in a vacuum oven at 50° C. overnight. Yield: Quantitative. TGA: Found % clay, 5.6 wt %; expected 5.5 wt %. $T_d$ 303° C. XRD: no peak, suggesting exfoliated structure.

Additional samples were prepared using the procedure for EVA-NC5.

Sample 2: EVA-NC1

A solution of EVA (19 g) in THF (100 mL) was mixed with 1 g of PVAc-B20 dispersed in THF (50 mL). TGA: Found 0.8 wt % clay, expected 1.1 wt %; $T_d$ 313° C.

Sample 3: EVA-NC2

A solution of EVA (18 g) in THF (100 mL) was mixed with 2 g of PVAc-B20 dispersed in THF (100 mL). TGA: Found 2.1 wt % clay, expected 2.2 wt %. $T_d$ 309° C.

Sample 4: EVA-NC0

This was prepared as a control by blending EVA (80 mol %) and the cationic copolymer PVAc-B (20 mol %) in THF using exactly the same procedure described for EVA-NC5 to give the sample that contained no clay. $T_d$ 309° C.

Still more samples were prepared following the same procedures for EVA-NC1, EVA-NC2 and EVA-NC5, respectively, by replacing PVAc-B20 with PVAc-20. The corresponding homopolymer blend control was designated as EVA-0, which was prepared by blending EVA with PVAc in THF using the procedure described for EVA-NC0.

Control Sample 1: EVA-1
TGA: Found 0.9 wt % clay, expected 1.2 wt %; $T_d$ 313° C.

Control Sample 2: EVA-2
TGA: Found 1.9 wt % clay, expected 2.4 wt %; $T_d$ 313° C.

Control Sample 3: EVA-5
TGA: Found 5.9 wt % clay, expected 6.1 wt %; $T_d$ 306° C.

Control Sample 4: EVA-0
TGA: 0 wt % clay; $T_d$ 309° C.

TABLE 3

Summary of Nanocomposites of EVA/Silicate for Experiment I

| EVA/MMT | Master-batch | PVAc (wt %) | Silicate (wt %) (calc) | Silicate (wt %) (TGA) | $T_{d1}$ (° C.) | $T_{d2}$ (° C.) |
|---|---|---|---|---|---|---|
| EVA | N/A | 0 | 0 | 0 | 316 | 432 |
| EVA-1 | PVAc-20 (20.5) | 4 | 1.2 | 0.9 | 313 | 433 |
| EVA-2 | PVAc-20 | 8 | 2.4 | 1.9 | 313 | 435 |
| EVA-5 | PVAc-20 | 20 | 6.1 | 5.9 | 306 | 433 |
| EVA-0 | PVAc-20 | 20 | 0 | 0 | 309 | 433 |
| EVA-NC1 | PVAc-B20 (21.9) | 4 | 1.1 | 0.84 | 313 | 434 |
| EVA-NC2 | PVAc-B20 | 8 | 2.2 | 2.1 | 309 | 431 |
| EVA-NC5 | PVAc-B20 | 20 | 5.5 | 5.6 | 303 | 436 |
| EVA-NC0 | PVAc-B20 | 20 | 0 | 0 | 309 | 435 |

Figure 8:
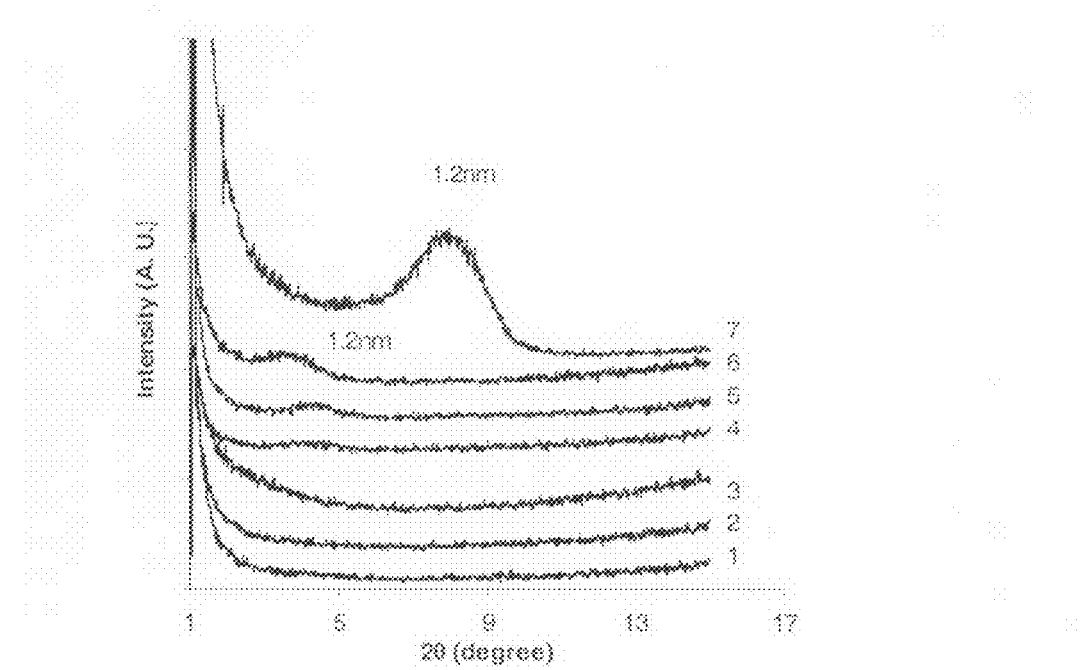
FIG. 8 is a graph of the XRD patterns of pristine MMT and EVA/MMT nanocomposites.

FIG. 8 shows XRD patterns for the EVA/MMT nanocomposites. Comparison of FIGS. 8 and 4 revealed very clearly that the XRD peak at 4° in the intercalated PVAc-20 masterbatch remained in the same position for EVA-5. However, the MMT peak, which reappeared at 8.3° in PVAc-20, disappeared probably because it was too small to be visible in the XRD of EVA-5. The d-spacing of EVA-5 was 2.1 nm, which is larger than the 1.2 nm d-spacing for pristine MMT, suggesting that the intercalated registry of clay layers in PVAc-20 were retained in EVA-5. EVA-1 and EVA-2, containing 1.2% and 2.3% clay, respectively, showed bumps at around 4.2. This observation suggests that XRD is sensitive enough to pick up as low as 1% clay in the nanocomposites. In contrast, for EVA-NC5, the XRD shoulder in PVAc-B20 disappeared completely, indicating the possibility of exfoliated nanostructure. Similar absence of XRD peaks was observed in both EVA-NC1 and EVA-NC2 (XRD provided as supporting information).

Figure 9:
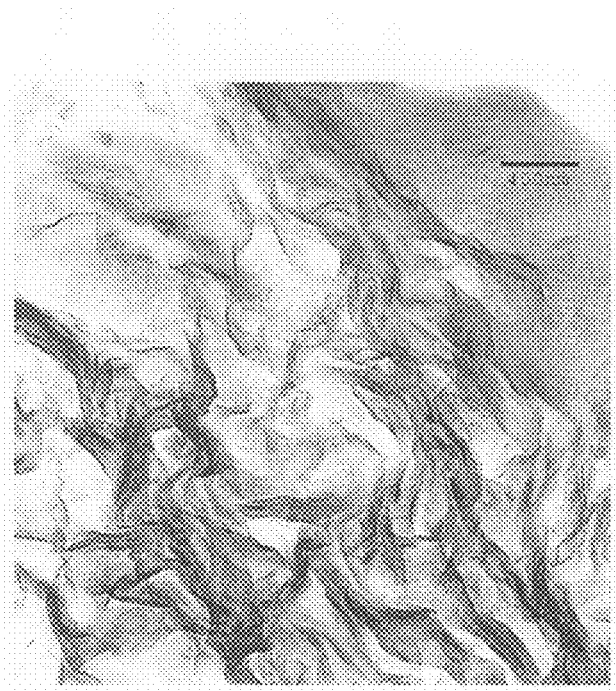
FIG. 9 is a low magnification TEM image of intercalated EVA-5.
Figure 10:
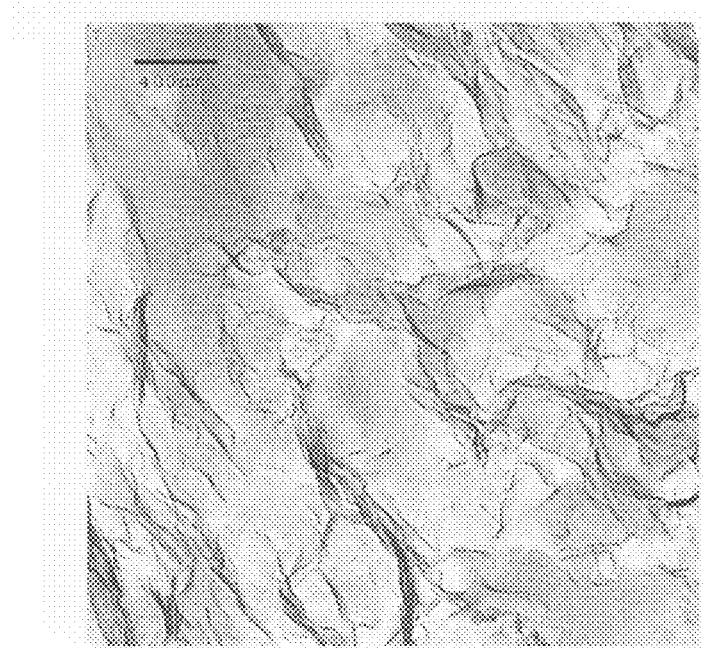
FIG. 10 is a low magnification TEM image of intercalated/exfoliated EVA-NC5.

TEM was performed to obtain further information about the nanostructure of the nanocomposites. As seen in FIG. 9, TEM of EVA-5 revealed mostly stacks of clay layers together with some single and double layers, which is in good agreement with the presence of a peak in its XRD pattern (FIG. 8). In contrast, as seen in FIG. 10, the TEM of EVA-NC5 showed mostly well-distributed single or double clay layers, consistent with the absence of any peak in its XRD curve. The PVAc-B20 masterbatch used to prepare EVA-NC5, due to its high clay content (ca. 22%), was not completely exfoliated as evidenced by the broad peak in its XRD (FIG. 4). This may explain the presence of some clay bundles in the its TEM. Hence, EVA-NC5 can be described as mostly exfoliated, while EVA-5 was predominantly intercalated.

Figure 11:
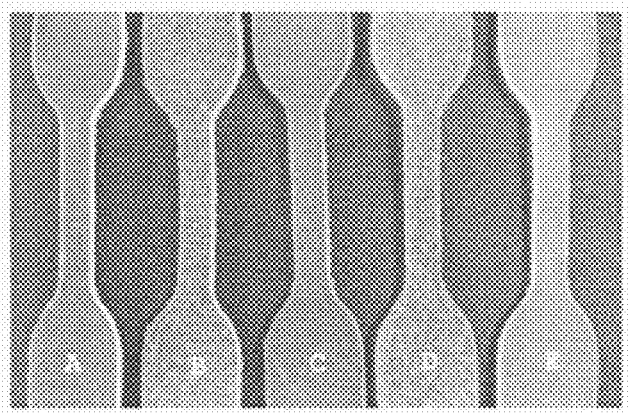
FIG. 11 is a magnified image of EVA and its nanocomposites.

As seen in FIG. 11, further evidence for the homogeneous morphology of the nanocomposites made from EVA-B20 masterbatch is provided by the optical clarity of injection-molded samples. EVA-NC1 and EVA-NC2 were similar to EVA in homogeneity and optical clarity. In contrast, clay aggregates could be clearly seen in EVA-1 and EVA2 sample bars.

Figure 12:
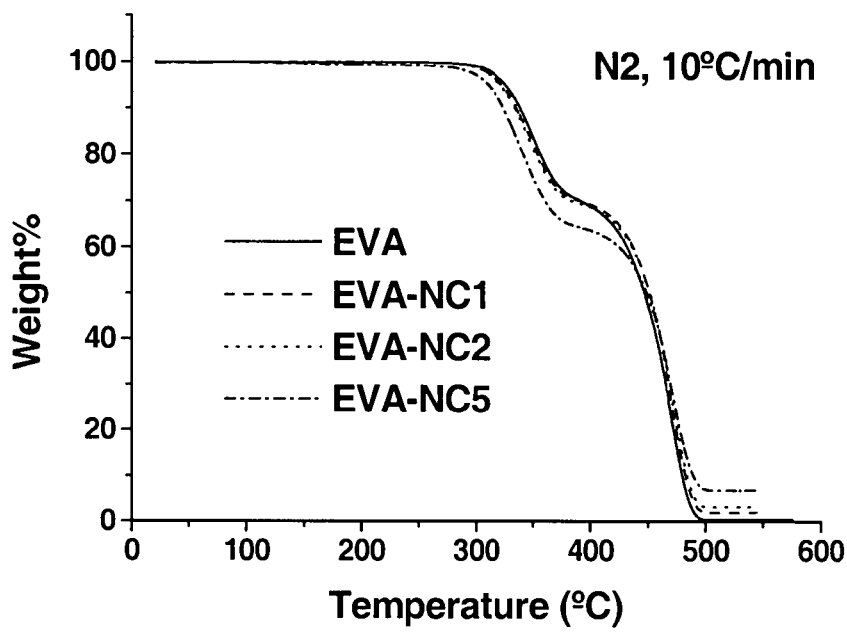
FIG. 12 is a graph illustrating the TGA of EVA and EVA-NC1, -NC2 and -NC5 under nitrogen.
Figure 13:
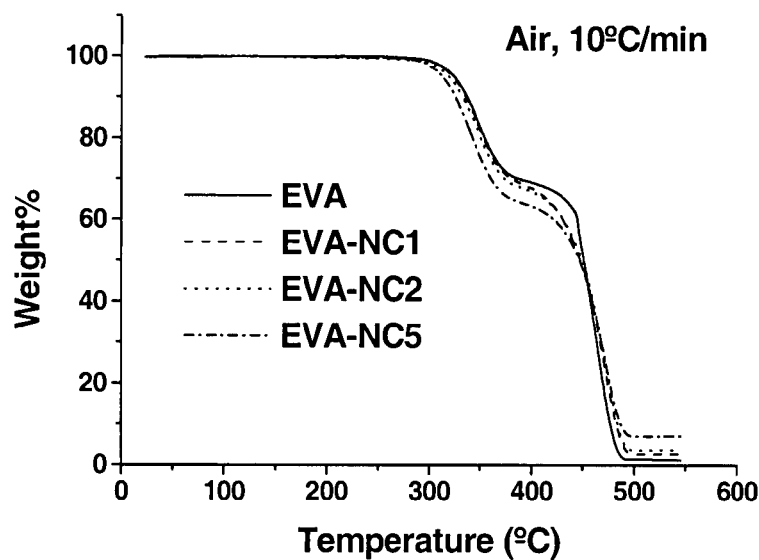
FIG. 13 is graph illustrating the TGA of EVA and EVA-NC1, -NC2 and -NC5 in air.

Under nitrogen, incorporation of clay accelerated the first degradation temperature of EVA by a few degrees but had almost no impact on the second degradation stage. FIG. 12 shows the TGA of the corresponding nanocomposites prepared from the masterbatches under nitrogen. The thermal behavior was the same as before in that all showed the two degradation steps. However, the influence of clay was almost non-existent in materials containing 1-2% clay while TGA of that containing 5.9% clay (EVA-NC5) showed some acceleration in the first step degradation. As shown in FIG. 13, when the TGA was carried out under air, the thermal oxidation gave slightly different results. The effects of clay on the first thermal oxidation step of the nanocomposites and EVA were similar to those observed under nitrogen. However, the second degradation step occurred at temperatures higher than that of neat EVA. The degradation temperature differential increased as the clay content increased and varied within the range of 5 to 25° C. TGA of EVA-1, -2, and -5 in air and nitrogen (provided as supporting information) was very similar to that of EVA-NC1, -NC2, and -NC5.

The dynamic mechanical properties of EVA/MMT nanocomposites of Experiment I were also determined and are summarized in Table 4.

TABLE 4

Dynamic mechanical properties of EVA and its nanocomposites in Experiment I.

| Sample | MMT (wt %)$^a$ | $T_g$ (° C.) | Storage Modulus (E' MPa) | | Tanδ$^b$ | |
|---|---|---|---|---|---|---|
| | | | at $T_g$ | at 15° C. | at $T_g$ | at 15° C. |
| EVA | 0 | −17.4 | 129 | 7.0 | 0.54 | 0.05 |
| EVA-1 | 0.9 | −17.6 | 122 | 8.3 | 0.52 | 0.08 |
| EVA-2 | 1.9 | −16.7 | 131 | 8.7 | 0.56 | 0.07 |
| EVA-5 | 5.9 | −18.9 | 272 | 17.2 | 0.51 | 0.13 |
| EVA-0 | 0 | −16.2 | 186 | 15.7 | 0.48 | 0.12 |
| EVA-NC1 | 0.84 | −17.6 | 142 | 9.7 | 0.56 | 0.09 |
| EVA-NC2 | 2.1 | −18.3 | 157 | 11.2 | 0.48 | 0.10 |
| EVA-NC5 | 5.6 | −17.9 | 290 | 30.7 | 0.41 | 0.15 |
| EVA-NC0 | 0 | −16.9 | 206 | 18.1 | 0.49 | 0.13 |

$^a$Measured by TGA.
$^b$Measured as peak height

Table 4 summarizes the storage modulus (E') and tan δ of EVA and its nanocomposites at $T_g$ and 15° C. The variation of tan δ and that of storage modulus with the temperature are plotted in FIGS. 14 and 15, respectively.

Figure 14:
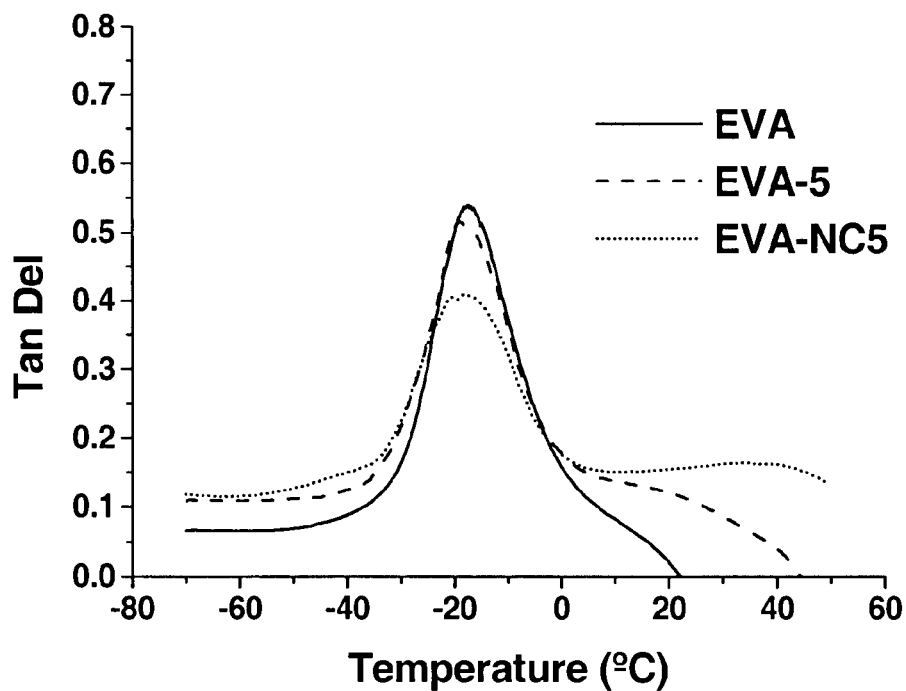
FIG. 14 is a graph illustrating the tan δ of EVA and EVA/MMT nanocomposites.

The $T_g$s of the nanocomposites containing about 5-6% clay were essentially the same as the $T_g$ of neat EVA as shown in FIG. 14 and Table 4. In general, adding PVAc to EVA should result in increased $T_g$ as the higher $T_g$ PVAc component increases. It appears the expected $T_g$ enhancement effect of PVAc was offset by the $T_g$ lowering effect of clay.

For EVA, the glass transition peak reflects β relaxation, which is generally believed to be due polymer segmental motion in the amorphous domain. As can be seen in FIG. 14, the height of tan δ for β relaxation varied for the three different EVA samples. The heights of tan δ for neat EVA and EVA-5 (5.9 w % clay) were very close to each other. In contrast, EVA-NC5 nanocomposite with almost the same clay content (5.6 wt %) showed a much smaller β relaxation peak. Closer examination of the tan δ at $T_g$ values (Table 4)

revealed a clear trend of decreasing β relaxation peak upon increasing clay content. The tan δ at $T_g$ decreased from 0.49 for EVA-NC0 (control) to 0.41 for EVA-NC5 of EVA-NC5 (Table 4).

In comparison, the tan δ values of the EVA-1, -2 and -5 were close to the value of neat EVA, which might be associated with the inhomogeneity of the intercalated structure of these nanocomposites. One possible explanation for the observations described above is that in EVA-NC5, the EVA polymer chains had more restricted mobility due to their interaction with PVAc chains that were attached to the clay. However, in EVA-5, the PVAc chains were not attached to the clay and the EVA chains' mobility was not confined in the same way as in EVA-NC5. Therefore the β relaxation was similar to that in neat EVA.

Figure 15:
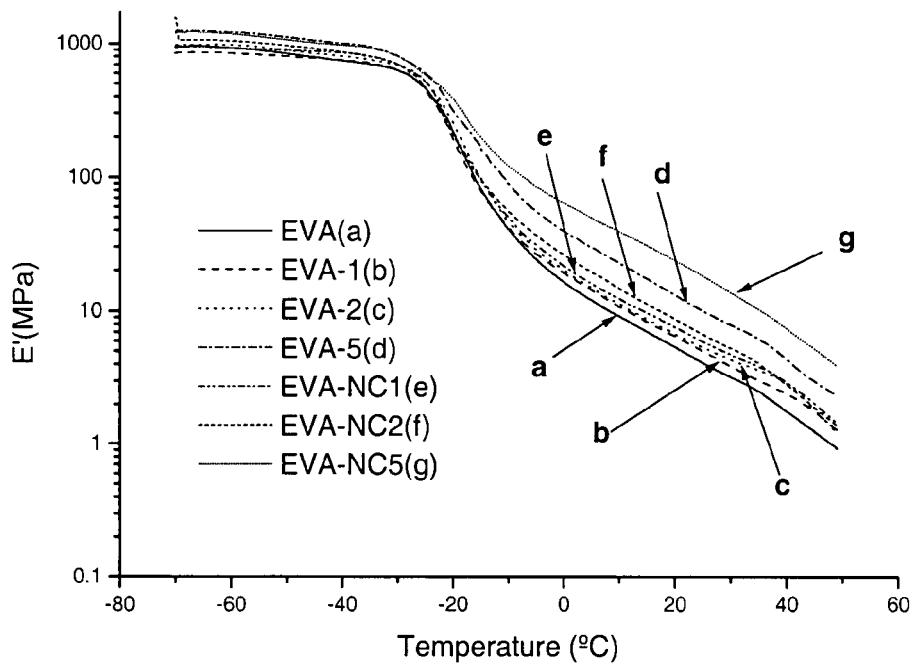
FIG. 15 is a graph illustrating the storage moduli of EVA and its nanocomposites.
Figure 16:
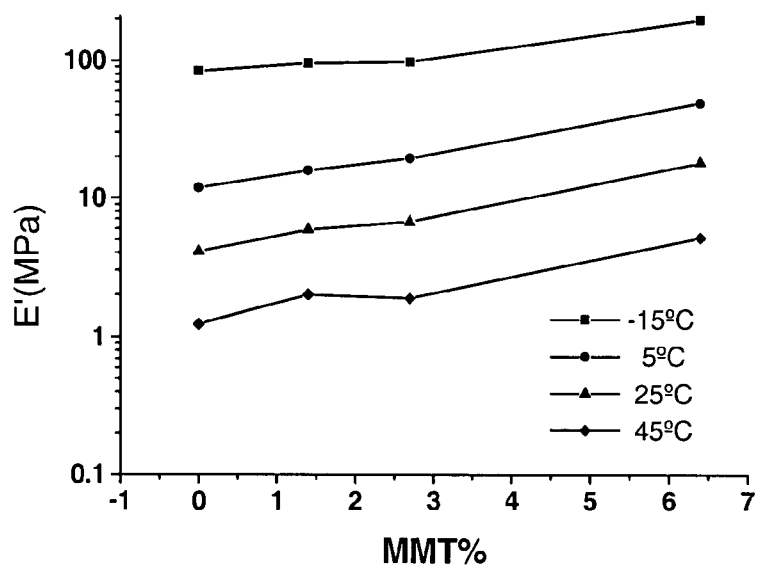
FIG. 16 is a graph illustrating the storage moduli of EVA-NC 1, 2, 5 varying with MMT content at different temperatures.

In order to determine the effect of clay on the storage modulus of EVA, DMA was carried out. FIG. 15 shows the storage modulus-temperature plots for the various nanocomposites, while FIG. 16 shows the plots of storage modulus versus clay content at selected temperatures for EVA-NC series. In general, addition of clay leads to improvement in modulus, which has been observed to depend on the extent of clay exfoliation. For each series of nanocomposites the storage modulus increases as the clay content increases. In addition, at temperatures above $T_g$, the storage moduli of the exfoliated EVA-NC1, -NC2, and -NC5 were higher than those of the corresponding intercalated EVA-1, -2, and -5 nanocomposites containing comparable amount of clay (FIG. 15). For example, at 15° C. the storage modulus of EVA-NC5 increased 4.4 times relative to that of EVA while for EVA-5 only 2.4 times improvement was observed (Table 4).

Figure 17:
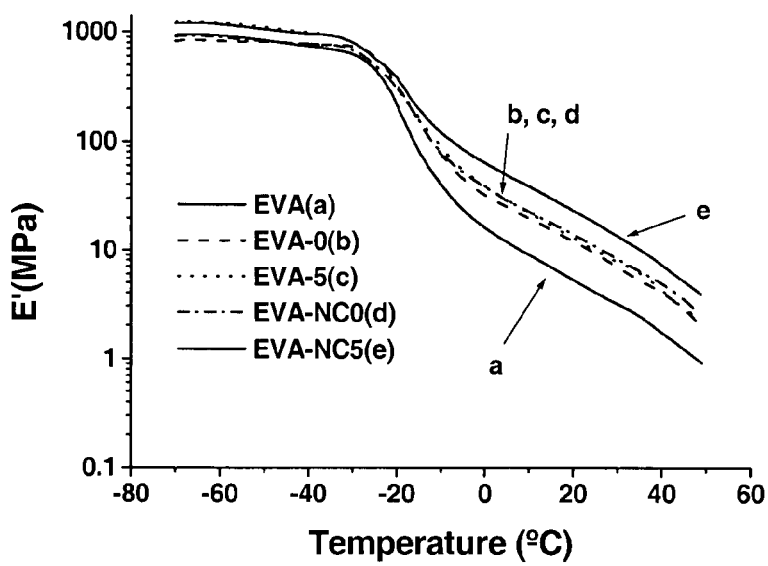
FIG. 17 is a graph illustrating the storage moduli of EVA nanocomposites containing 6.4% clay and corresponding to EVA/PVAc blends.

An important question arises that concerns the relative contributions of both the PVAc copolymer from the masterbatch and the clay to the observed differences in properties. To address this question, EVA/PVAc blends were synthesized without clay and measured their dynamic mechanical properties. The results are shown in FIG. 17. Their composition and properties are shown in Table 5.

TABLE 5

EVA/MMT composites and corresponding EVA/PVAc blends in Experiment I

| Nanocomposite | Masterbatch | PVAc wt % | MMT wt % (TGA) | Tg (° C.) | E'(MPa) at 15° C. | Tanδ at 15° C. |
|---|---|---|---|---|---|---|
| EVA | N/A | 0 | 0 | −17.4 | 7 | 0.05 |
| EVA-0 | PVAc | 20 | 0 | −16.2 | 15.7 | 0.12 |
| EVA-5 | PVAc-20 | 20 | 5.9 | −18.9 | 17.2 | 0.13 |
| EVA-NC0 | PVAc-B | 20 | 0 | −16.9 | 18.1 | 0.13 |
| EVA-NC5 | PVAc-B20 | 20 | 5.6 | −17.9 | 30.7 | 0.15 |

The blends EVA-0 and EVA-NC0 contained about 20 wt % PVAc, which was very close to the actual PVAc percentage in the formed EVA-5 and EVA-NC5 nanocomposites. The storage moduli of EVA-5, EVA-NC5 and corresponding EVA/PVAc blends EVA-0 and EVA-NC0 are plotted in FIG. 16. Clearly, just by introducing 20 wt % of PVAc to EVA the storage modulus increased by more than twice in both blends compared to that of neat EVA. However, when clay was incorporated, the two EVA nanocomposites behaved quite differently. Thus, whereas EVA-NC5 showed improvement in storage modulus over that of EVA-NC0, EVA-5 and EVA-0 curves almost overlapped. The storage moduli at 15° C. of EVA-NC5 increased 1.7 times that of EVA-NC0 while that of EVA-5 increased by a factor of 1.1 compared to EVA-0.

Based on the above results, it is reasonable to conclude that the improvement in storage modulus is a consequence of the presence of both the clay and polymer from the masterbatch and that the improvement was highest when the clay was well exfoliated in the polymer. Dynamic mechanical analysis is a very useful tool to measure viscoelastic properties of polymer materials, which can often be used as a good indicator for mechanical behavior.

The mechanical properties measurements for Experiment I are as follows.

TABLE 6

Tensile properties of EVA/MMT nanocomposites

| Samples | MMT[a] wt % | Strength at yield[b] (MPa) | Elongation[b] at yield (%) | Young's Modulus[b] (MPa) | Toughness[b] (MPa) | $\Delta H_c^c$ (J/g) |
|---|---|---|---|---|---|---|
| EVA | 0 | 3.082 | 391 | 1.595 | 9.755 | 9.961 |
| EVA-1 | 0.9 | 3.723 (+21%) | 247 (−37%) | 2.647 (+66%) | 7.688 (−21%) | N/A |
| EVA-2 | 1.9 | 3.791 (+23%) | 236 (−40%) | 2.655 (+66%) | 6.902 (−29%) | 8.209 |
| EVA-5 | 5.9 | 5.439 (+76%) | 189 (−52%) | 4.070 (+155%) | 7.128 (−27%) | 7.184 |
| EVA-NC1 | 0.84 | 3.586 (+16%) | 267 (−32%) | 2.252 (+41%) | 7.680 (−21%) | N/A |
| EVA-NC2 | 2.1 | 4.478 (+45%) | 244 (−38%) | 3.209 (+101%) | 8.442 (−13%) | 8.504 |
| EVA-NC5 | 5.6 | 6.110 (+98%) | 212 (−46%) | 4.670 (+193%) | 9.173 (−6%) | 6.889 |

[a]Measured by TGA.
[b]Measured using Instron, crosshead speed 5 mm/min.
[c]Measured by DSC.

TABLE 7

Tensile properties of EVA nanocomposites and EVA/PVAc polymer blends

| Sample | PVAc wt % | MMT[a] wt % | Strength at yield[b] (MPa) | Elongation at yield[b] (%) | Young's Modulus[b] (MPa) | Toughness[b] (MPa) | $\Delta H_c^c$ (J/g) |
|---|---|---|---|---|---|---|---|
| EVA | 0 | 0 | 3.082 | 391 | 1.595 | 9.755 | 9.961 |
| EVA-0 | 20 | 0 | 3.715 (+21%) | 232 (−41%) | 2.875 (+80%) | 6.786 (−30%) | 7.695 |
| EVA-5 | 20 | 5.9 | 5.439 (+76%) (+46%)[d] | 189 (−52%) (−18%)[d] | 4.070 (+155%) (+42%)[d] | 7.128 (−27%) (+5%)[d] | 7.184 |
| EVA-NC0 | 20 | 0 | 3.714 (+21%) | 232 (−41%) | 2.975 (+87%) | 7.393 (−24%) | 7.791 |

TABLE 7-continued

Tensile properties of EVA nanocomposites and EVA/PVAc polymer blends

| Sample | PVAc wt % | MMT[a] wt % | Strength at yield[b] (MPa) | Elongation at yield[b] (%) | Young's Modulus[b] (MPa) | Toughness[b] (MPa) | ΔH$_c$[c] (J/g) |
|---|---|---|---|---|---|---|---|
| EVA-NC5 | 20 | 5.6 | 6.110 (+98%) (+65%)[e] | 212 (−46%) (−9%)[e] | 4.670 (+193%) (+57%)[e] | 9.173 (−6%) (+24%)[e] | 6.889 |

[a]Measured by TGA.
[b]Measured using Instron, crosshead speed 5 mm/min.
[c]Measured by DSC.
[d]The percentage changes were calculated with respect to the corresponding values for EVA-0.
[e]The percentage change was calculated with respect to the corresponding values for EVA-NC0.
[f]All the rest percentage changes were calculated with respect to the corresponding values for EVA.

Flammability tests on a small-scale calorimeter that measures heat release rate (HRR) on milligram quantities were also carried out. For most commercial polymers, a good correlation between the peak HRR obtained using the microscale calorimeter and cone calorimeters has been established.

TABLE 8

Flammability test of EVA nanocomposite

| Samples | Clay wt % | TGA 1st deg. °C. | Peak HRR (J/g-K) | Total HR (kJ/g) | Char (%) | Peak1 °C. | Peak2 °C. |
|---|---|---|---|---|---|---|---|
| EVA39 | 0 | 316 | 628 | 34.3 | 0 | 369 | 488 |
| EVA-2 | 1.9 | 313 | 545 | 32.7 | 2.1 | 360 | 488 |
| EVA-5 | 5.9 | 306 | 451 | 29 | 6.1 | 355 | 490 |
| EVA-0 | 0 | 309 | 510 | 31.8 | 0.4 | 365 | 499 |
| EVA-NC2 | 2.1 | 309 | 526 | 32.4 | 1.9 | 359 | 488 |
| EVA-NC5 | 5.6 | 303 | 474 | 29.3 | 5.6 | 351 | 490 |
| EVA-NC0 | 0 | 309 | 487 | 31.2 | 0.6 | 364 | 498 |

Figure 18:
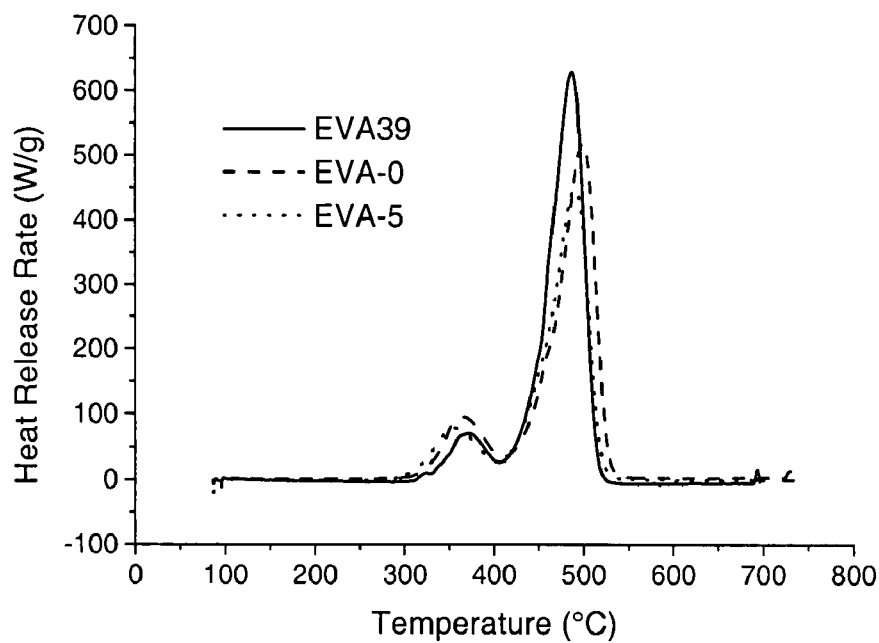
FIG. 18 is a graph illustrating the heat release versus temperature of EVA and EVA nanocomposites.

For EVA and EVA nanocomposites, conventional cone calorimeters always give heat release rate plots with only one broad peak or a peak with a shoulder. Using the microscale calorimeter developed by FAA, it was found that HRR plots of EVA and EVA nanocomposites were composed of two well resolved peaks as shown in FIG. 18. The first peak occurring at 360° C. reflected combustion of vinyl acetate units, or more specifically, deacetylation gases of EVA. The second peak occurred at about 490° C. and represented combustion of ethylene units and the polyene backbone from the deacetylation reaction.

HRR is believed to be the most important parameter reflecting the fire hazard of a material. In case of EVA copolymer, the second peak in the test corresponded to the peak HRR reported using regular cone calorimeters. The peak HRR is summarized in the HR capacity column in Table 8. EVA nanocomposites showed smaller peak HRR than neat EVA. For example, the peak HRR of EVA-NC2 dropped 16%. For EVA-NC5, containing 5.6% clay, the peak HRR dropped further (24%).

Besides peak HRR, total heat release calculated from the total area under both HR peaks is another important parameter to evaluate fire hazard. EVA-NC5 showed total HR reduction of about 16%, which is better than previous report.

When the intercalated EVA nanocomposites and the exfoliated EVA nanocomposites are compared in Table 8, it is clearly seen that there is not much difference in peak HRR and total HR values. The exfoliated EVA-NC5 even had slightly higher values than the intercalated nanocomposite EVA-5. This result might be due to the fact that EVA-5 had slightly higher clay content as indicated by both TGA residue and flammability char content. The data suggests that clay content was the main determining factor and the extent of clay exfoliation did not have any influence on the flame retardancy behavior as measured by the microscale calorimeter. Some previous reports suggested that extent of exfoliation affected the flame retardancy. The discrepancy is likely due to the small scale of the specimens necessitated by the microscale calorimeter. Conventional cone calorimeter requires a specimen scale of 50 grams. The microscale calorimeter used in the present work was specifically designed to handle milligram scale quantities. Although a correlation between conventional calorimetric results and data collected on the microscale instrument for most common polymers has been established, the correlation was not established for polymer/inorganic nanocomposites. For nanocomposites tested on a large-scale calorimeter, the decreased flammability was attributed to a "labyrinth" effect of silicate layers. The reassembly of the clay layers presumably formed a carbonaceous charred surface, which acted as a barrier to slow down the diffusion of volatile combustibles into the gas phase and the diffusion of oxygen into the material. Such a barrier effect would be harder to observe for microscale samples.

Examination of Table 8 revealed that the first peak of EVA nanocomposite combustion occurred at a temperature 10-20° C. lower than that of neat EVA. Similar to thermal degradation, this phenomenon might be due to catalysis by the clay surface leading to Hoffmann Elimination.

Neat EVA has the highest HRR peak 628 J/g·K$^{-1}$ (peak 2, FIG. 18). When 20% PVAc was introduced as in case of EVA-0, the height of peak 2 dropped to 510 J/g·K$^{-1}$. Upon addition of 5% clay, peak 2 HRR dropped further to 451 J/g·K$^{-1}$. Hence, the decreased peak HRR was due to the incorporation of both PVAc modifier and clay.

The total heat release included both contribution from PVAc and PE, which overlapped in the HRR plot. Hence, a curve fitting program was used to resolve them in order to assess the relative contribution of the two components. The results are presented in Table 9 which indicated that the total HR could also be attributed to both PVAc and clay.

TABLE 9

Data fit of EVA/MMT nanocomposite flammability results

| Sample | Clay wt % | PVAc fraction | PE fraction | PVAc area (kJ/g) | PE area (kJ/g) | Total peak area (kJ/g) |
|---|---|---|---|---|---|---|
| EVA39 | 0 | 0.14 | 0.86 | 4.63 | 29.66 | 34.29 |
| EVA-0 | 0 | 0.18 | 0.82 | 5.75 | 26.06 | 31.81 |

TABLE 9-continued

Data fit of EVA/MMT nanocomposite flammability results

| Sample | Clay wt % | PVAc fraction | PE fraction | PVAc area (kJ/g) | PE area (kJ/g) | Total peak area (kJ/g) |
|---|---|---|---|---|---|---|
| EVA-5 | 5.9 | 0.18 | 0.82 | 5.18 | 23.70 | 28.89 |
| EVA-NC0 | 0 | 0.19 | 0.81 | 5.81 | 25.34 | 31.15 |
| EVA-NC5 | 5.6 | 0.18 | 0.82 | 5.23 | 23.95 | 29.18 |

Neat EVA total HRR plot was composed of two peaks. The first peak, vinyl acetate deacetylation, accounted for 0.14 fraction of total TR, while ethylene and polyene backbone accounted for the remaining 0.86. When 20% vinyl acetate was added to neat EVA exemplified by EVA-0, deacetylation contribution rose to 0.18 and consequently, ethylene fraction dropped to 0.82. However, when the actual peak areas were calculated, it was found that although the vinyl acetate area increased, the ethylene area decreased more significantly, leading to an overall decreased total HR area (31.81 kJ/g), smaller than the total HR of neat EVA (34.29 kJ/g). For EVA-5, since it contained the same amount of PVAc as EVA-0, the fractions of two peaks did not change. However, incorporation of clay reduced both vinyl acetate (5.18 kJ/g) and ethylene (23.70 kJ/g) peak areas and thus reduced the total HR area to 28.89 kJ/g. Exfoliated EVA-NC5 and control EVA-NC0 showed similar trends. Therefore, it can be concluded that the peak HRR and total HR of EVA nanocomposites are attributed to incorporation of both PVAc modifier and clay.

TABLE 10

Flammability test under air

| Sample | Clay wt % | TGA 1st deg. °C. | Peak HRR (J/g-K) | Total HR (kJ/g) | Peak1 °C. | Peak2 °C. |
|---|---|---|---|---|---|---|
| EVA39 | 0 | 316 | 1079 | 33.31 | 357 | 478 |
| EVA-0 | 0 | 309 | 541 | 32.2 | 353 | 462 |
| EVA-5 | 5.9 | 306 | 458 | 30.1 | 348 | 466, 494 |
| EVA-NC0 | 0 | 309 | 559 | 32.3 | 359 | 469 |
| EVA-NC5 | 5.6 | 303 | 374 | 29.66 | 360 | 493 |

In the flammability test described above, milligrams of samples were first decomposed in a pyrolysis tube under $N_2$ purge before the combustible gases mixed with $O_2$ in the combustion furnace. This design avoided the complication from gas phase combustion such as heat feedback and obscuration of sample surface from the flame. In regular cone calorimetric experiments performed in air, it is very hard to eliminate the influence of gas phase combustion. Therefore, in this study, flammability tests of EVA nanocomposites were also carried out under air flow. From the results shown in Table 10, the HR capacity and total HR values are similar to the results of regular tests under $N_2$. The occurrence of ethylene combustion was however delayed. The peak position of EVA-NC5 occurred at a temperature 15° C. higher than EVA and 24° C. higher than polymer blend of EVA-NC0 control. This delayed ethylene combustion peak might be related to oxygen diffusion shielding effect of nanoscale clay layers in the nanocomposite. This observation agrees well with delayed thermal oxidation temperature for EVA nanocomposites discussed above.

Example II

Production of EVA Nanocomposite Using DMAEAQ as Quaternary Ammonium Compound

Copolymerization of Vinyl Acetate with DMAEAQ

Cationically functionalized PVAc was produced using varying amounts of DMAEAQ.

Sample 1: PVAc-A.

A 500-mL three-neck round-bottom flask, equipped with a mechanical stirrer, a nitrogen gas inlet, and an addition funnel containing DMAEAQ (1.00 g, 5.16 mmol) dissolved in methanol (14 mL), was charged with distilled vinyl acetate (100.00 g, 1.16 mol), DMAEAQ (0.06 g, 0.31 mmol), and degassed methanol (33 mL). Nitrogen was bubbled through the mixture in the flask for 30 min while stirring at a speed of 100 rpm. The mixture was heated to 60° C. with constant stirring. AIBN (0.96 g, 5.82 mmol) was then added. Addition of the methanol solution of DMAEAQ in the addition funnel was begun and continued throughout the course of the polymerization, which lasted for 1.5 h. The reaction mixture, which had turned viscous and a little cloudy, was cooled to room temperature, diluted with acetone (250 mL), and poured into hexanes (2 L). The tacky precipitate that formed was isolated by decanting off the solvents. The isolated polymer was dissolved in methanol (500 mL) and poured into a large amount of cold water (approximately 8-10-fold) to precipitate the polymer as a white solid. (Note: Sometimes it was found convenient to perform the precipitation in 1-L batches.) The precipitation from the methanol/water mixture was repeated once, and the isolated solid polymer was dried in a vacuum oven at 50° C. overnight to give the copolymer designated PVAc-A. Yield: 32 g (32%). Composition of the copolymer by 1H NMR: calcd for DMAEAQ, 0.45 mol %; found, 0.37 mol %. GPC: $M_n$ 63 000, $M_w$ 130 000.

Sample 2: PVAc-B

PVAc-B was prepared via the above procedure using the following amounts of reagents and solvent: vinyl acetate, 100 g (1.16 mol); initial DMAEAQ in the flask, 0.48 g (2.48 mmol); initial methanol in the flask, 33 mL; AIBN, 0.96 g (5.82 mmol); DMAEAQ in the additional funnel, 8.0 g (41.31 mmol) dissolved in methanol (14 mL). Yield: 30 g (28%). Composition by $^1$H NMR: DMAEAQ found 100 mol %, expected 3.6 mol %. GPC: $M_n$ 57.00 $M_w$ 102.00.

Sample 3: PVAc-C.

A 500-mL three-neck round-bottom flask, equipped with a mechanical stirrer, a nitrogen gas inlet, and a syringe pump containing DMAEAQ (16.00 g, 82.61 mmol) dissolved in degassed methanol (28 mL), was charged with distilled vinyl acetate (100.00 g, 1.16 mol), DMAEAQ (0.96 g, 4.96 mmol), and degassed methanol (66 mL). Nitrogen was bubbled through the mixture in the flask for 30 min while stirring at a speed of 100 rpm. The mixture was heated to 60° C. with continued stirring. AIBN (0.96 g, 5.82 mmol) was added. The addition of the methanol solution of DMAEAQ in the syringe pump was begun at 0.2 mL/min and continued over a 3-h period. The reaction was stirred at 60° C. for an additional 1 h. The reaction mixture, which has turned viscous and a little cloudy, was cooled to room temperature, diluted with acetone (250 mL), and poured into hexanes (2 L). The solvents were decanted off to give a tacky precipitate, which was dissolved in methanol (500 mL) and poured into cold water (1 L). A white sticky suspension resulted that could not be readily filtered. This was therefore centrifuged (in 200-mL batches) at 7000 rpm for 30 min, and the solvents were decanted off. The resulting solid was triturated with water (400 mL), centrifuged, and filtered. The trituration with water and centrifuging was repeated once, and the isolated solid was dried in a vacuum oven at 50° C. overnight. Yield: 59 g (51%). Composition by 1H NMR: calcd for DMAEAQ, 7.2 mol %; found, 2.14 mol %. GPC: $M_n$ 21 000, $M_w$ 66 000.

Control Sample 1: PVAc

A 500-mL three-neck round-bottom flask, equipped with a mechanical stirrer and a nitrogen gas inlet, was charged with distilled vinyl acetate (100.00 g, 1.16 mol) and degassed methanol (33 mL). Nitrogen was bubbled through the mixture in the flask for 30 min while stirring at a speed of 100 rpm. The mixture was heated to 60° C. followed by addition of AIBN (0.96 g, 5.82 mmol). The stirring was continued at 60° C. for a total reaction time of 1.5 h. The reaction mixture was cooled to room temperature, diluted with acetone (250 mL), and poured into hexanes (2 L). The precipitate that formed was isolated by decanting off the solvents, dissolving the residue in methanol (500 mL), and pouring the resulting solution into a large amount of cold water approximately 8-10-fold) to precipitate the polymer as a white solid. The precipitation from the methanol/water mixture was repeated once. The white solid was dried in a vacuum oven at 50° C. overnight. Yield: 50 g (50%). GPC: $M_n$ 54 000, $M_w$ 129 000.

Production of PVAc/Silicate Nanocomposite

PVAc/silicate nanocomposites using varying amount of silicate were prepared. A typical procedure follows:

Sample 1: PVAc-A20

A 1-L Erlenmeyer flask was charged with PVAc-A (12 g) and methanol (600 mL). To this solution, silicate (3 g) dispersed in 150 mL of water was added slowly with stirring. The mixture was heated to 50° C., stirred for 4 h, cooled to room temperature, and transferred into a round-bottom flask. The methanol was removed as completely as possible using a rotatory evaporator to give an aqueous suspension. This was filtered, and the resulting white precipitate was washed with water and dried overnight in a vacuum oven at 50° C. to give a white solid, designated PVAc-A20. Yield: 12.0 g (80%). TGA: calculated for silicate, 20 wt %; found, 20.5 wt %. First onset decomposition temperature ($T_{d1}$), 306° C. Second onset decomposition temperature ($T_{d2}$), 424° C. XRD: d spacing, 2.0 nm.

Sample 2: PVAc-A05

The above procedure was followed using 0.95 g of PVAc-A, 10 mL of methanol and 0.05 g of silicate dispersed in 2.5 mL of water. Yield: 0.65 g (65%). TGA: calculated for silicate, 5 wt %; found, 5.3 wt %. First onset decomposition temperature ($T_{d1}$), 309° C. Second onset decomposition temperature ($T_{d2}$), 430° C. XRD: no peak.

Sample 3: PVAc-A10

The same procedure was followed using 0.90 g of PVAc-A, 20 mL of methanol, and 0.10 g of silicate dispersed in 5 mL of water. Yield: 0.82 g (82%). TGA: calculated for silicate, 10 wt %; found, 9.1 wt %. $T_{d1}$ 309° C. $T_{d2}$ 430° C. XRD: a very small broad shoulder, not very well defined.

Sample 4: PVAc-B05

The procedure for PVAc-A05, in which PAVc-B was substituted for PVAc-A, was used. Yield: 0.64 g (64%). TGA: calculated for silicate, 5 wt %; found, 5.9 wt %. $T_{d1}$ 313° C. $T_{d2}$ 430° C. XRD: no peak.

Sample 5: PVAc-B10

The procedure for PVAc-A10, in which PAVc-B was substituted for PVAc-A, was used. Yield: 0.64 g (64%). TGA: calculated for silicate, 10 wt %; found, 11.8 wt %. $T_{d1}$ 306° C. $T_{d2}$ 430° C. XRD: no peak.

Sample 6: PVAc-B20

The procedure for PVAc-A20, in which PAVc-B was substituted for PVAc-A, was used. Yield: 13 g (87%). TGA: calculated for silicate, 20 wt %; found, 21.9 wt %. $T_{d1}$ 303° C. $T_{d2}$ 430° C. XRD: a very small broad shoulder with d spacing of approximately 2.4 nm.

Control Sample 1: PVAc-05

The procedure for PVAc-A05, in which PVAc homopolymer was substituted for PVAc-A was used. Yield: 0.75 g (75%). TGA: calculated for silicate, 5 wt %; found, 5.8 wt %. $T_{d1}$ 315° C. $T_{d2}$ 430° C. XRD: a very small broad peak, not very well defined.

Control Sample 2: PVAc-10

The procedure for PVAc-A10, in which PVAc homopolymer was substituted for PVAc-A was used. Yield: 0.76 g (76%). TGA: calculated for silicate, 10 wt %; found, 13 wt %. $T_{d1}$ 309° C. $T_{d2}$ 430° C. XRD: d spacing 2.1 nm.

Control Sample 3: PVAc-20

The procedure for PVAc-A20, in which PVAc homopolymer was substituted for PVAc-A was used. Yield: 12.3 g (82%). TGA: calculated for silicate, 20 wt %; found, 24.4 wt %. $T_{d1}$ 305° C. $T_{d2}$ 430° C. XRD: d spacing 2.1 nm.

Sample 7: PVAc-C20

The procedure for PVAc-A20, in which PAVc-C was substituted for PVAc-A, was used with the following modifications. PVAc-C (40 g), methanol (2 L), silicate (10 g dispersed in 500 mL of water) and 4-L Erlenmeyer flask was used. Yield: 47 g (94%). TGA: calculated for silicate, 20 wt %; found, 24.9 wt %. $T_{d1}$ 309° C. $T_{d2}$ 430° C. XRD: no peak.

Solution Blending of EVA Nanocomposite

EVA/silicate nanocomposites containing varying amounts of silicate were prepared by solution blending of EVA with PVAc-B20 masterbatch. A typical procedure is described below.

Sample 1: EVA-NC5

To a 500-mL Erlenmeyer flask, containing a magnetic stirring bar, were added PVAc-B20 master-batch (5 g) and THF (250 mL). The dispersion was stirred overnight at room temperature and then sonicated for 1 h. A separate 500 mL round-bottom flask was charged with EVA (15 g) and THF (100 mL). To this solution was added the preformed masterbatch dispersion. The reaction mixture was heated to 50° C. and maintained at this temperature with stirring for 4 h. After it was allowed to cool to room temperature, the mixture was evaporated in vacuo to dryness. The resulting nanocomposite, designated EVA-NC5, was dried overnight in a vacuum oven at 50° C. Yield: Quantitative. TGA: calculated for silicate, 5.5 wt %; found, 5.6 wt %. $T_{d1}$ 311° C. $T_{d2}$ 445° C. XRD: no peak.

Sample 2: EVA-NC1

The procedure for EVA-NC5 was followed using 19 g of EVA dissolved in 100 mL of THF and a dispersion of PVAc-B20 (1.0 g) in THF (50 mL). Yield: Quantitative. TGA: calculated for silicate, 1.1 wt %; found 0.8 wt %. $T_{d1}$ 313° C. $T_{d2}$ 434° C. XRD: no peak.

Sample 3: EVA-NC2

The procedure for EVA-NC5 was followed using 18 g of EVA dissolved in 100 mL of THF and a dispersion of PVAc-B20 (2 g) in THF (50 mL). Yield: Quantitative. TGA: calculated for silicate, 2.2 wt %; found 2.1 wt %. $T_{d1}$ 309° C. $T_{d2}$ 431° C. XRD: no peak.

Sample 4: EVA-NC0

The procedure for EVA-NC5 was followed using 16 g of EVA dissolved in 100 mL of THF and a dispersion of PVAc-B20 (4 g) in THF (50 mL). Yield: Quantitative. TGA: calculated for silicate, 0.0 wt %; found 0.0 wt %. $T_{d1}$ 309° C. $T_{d2}$ 435° C.

Control Sample 1: EVA-1

The procedure for EVA-NC1 was followed using 19 g of EVA dissolved in 100 mL of THF and a dispersion of PVAc-20 (1 g) in THF (50 mL). Yield: Quantitative. TGA: calculated for silicate, 1.2 wt %; found 0.9 wt %. $T_{d1}$ 313° C. $T_{d2}$ 433° C. XRD: d spacing 2.0 nm (a small bump).
Control Sample 2: EVA-2
The procedure for EVA-NC2 was followed using 18 g of EVA dissolved in 100 mL of THF and a dispersion of PVAc-20 (2 g) in THF (50 mL). Yield: Quantitative. TGA: calculated for silicate, 2.4 wt %; found 1.9 wt %. $T_{d1}$ 313° C. $T_{d2}$ 435° C. XRD: d spacing 2.0 nm (a small bump).
Control Sample 3: EVA-5
The procedure for EVA-NC5 was followed using 15 g of EVA dissolved in 100 mL of THF and a dispersion of PVAc-20 (5 g) in THF (50 mL). Yield: Quantitative. TGA: calculated for silicate, 6.1 wt %; found 5.9 wt %. $T_{d1}$ 306° C. $T_{d2}$ 433° C. XRD: d spacing 2.1 nm.
Control Sample 4: EVA-0
The procedure for EVA-NC0 was followed using 16 g of EVA dissolved in 100 mL of THF and a solution of PVAc (4 g) in THF (50 mL). Yield: Quantitative. TGA: calculated for silicate, 0.0 wt %; found 0.0 wt %. $T_{d1}$ 309° C. $T_{d2}$ 433° C.

$T_g$ values of the nanocomposites did not change significantly compared with the $T_g$ of neat EVA. Upon addition of PVAc to form EVA-0, $T_g$ of EVA increased slightly from −17.4 to −16.2° C. Similarly, addition of the copolymer to form EVA-NC0 led to a very small increase in $T_g$. However, upon addition of the silicate the $T_g$ decreased, with EVA-5 exhibiting the lowest value (−18.9° C.). A similar trend was observed for the exfoliated nanocomposites. Thus, as the masterbatch nanocomposite was added to EVA the $T_g$ changed as follows: −17.6° C. for EVA-NC1, −18.3° C. for EVA-NC2, and −17.9° C. for EVA-NC5. These changes are small, suggesting that the influence of the silicate on the thermal transitions is not significant. This is possibly due to the fact that in these nanocomposites the EVA chains interact mainly with the PVAc attached to the silicate. This is the main premise of the masterbatch concept, that is, to minimize the incompatibility between the main organic polymer matrix and the hydrophilic silicate by inserting a polymeric modifier that is compatible with both the polymer matrix and the silicate.

TABLE 11

EVA/Silicate Nanocomposites prepared from masertbatches

| nanocomposite designation | masterbatch or polymer, wt (a) | EVA wt (g) | PVAc or copolymer (wt %) | MMT (wt %; calcd) | MMT (wt %) | TGA $T_{d1}^d$ (° C.) | $T_{d2}^e$ (° C.) |
|---|---|---|---|---|---|---|---|
| EVA | N/A[c] | N/A[c] | 0 | 0 | 0 | 322 | 442 |
| EVA-1 | PVAc-20 [20.5][b] (1) | 19 | 4 | 1.0 | 0.9 | 318 | 443 |
| EVA-2 | PVAc-20 (2) | 18 | 8 | 2.1 | 1.9 | 321 | 443 |
| EVA-5 | PVAc-20 (5) | 15 | 20 | 5.1 | 5.9 | 311 | 444 |
| EVA-0 | PVAc (4) | 16 | 20 | 0 | 0 | 309 | 433 |
| EVA-NC1 | PVAc-B20 [21.9][b] (1) | 19 | 4 | 1.0 | 0.84 | 319 | 444 |
| EVA-NC2 | PVAc-B20 (2) | 18 | 8 | 2.2 | 2.1 | 318 | 444 |
| EVA-NC5 | PVAC-B20 (5) | 15 | 20 | 5.5 | 5.6 | 311 | 445 |
| EVA-NC0 | PVAc-B (4) | 16 | 20 | 0 | 0 | 309 | 435 |

[b]Numbers in parentheses denote actual silicate percentages in the masterbatches.
[c]Not applicable.
[d]First onset decomposition temperatures under nitrogen.
[e]Second onset temperatures under nitrogen.

Dynamic Mechanical Properties of EVA/Silicates Nanocomposites

Table 12 summarizes the storage modulus (E') and tan δ of EVA and EVA/silicate nanocomposites at $T_g$ and 15° C.

TABLE 12

Dynamic Mechanical Properties of EVA and its Nanocomposites

| sample | MMT[a] (wt %) | $T_g$ (° C.) | storage modulus (E', MPa) at $T_g$ | at 15° C. | tan δ[b] at $T_g$ | at 15° C. |
|---|---|---|---|---|---|---|
| EVA | 0 | −17.4 | 129 | 7.0 | 0.54 | 0.05 |
| EVA-0[c] | 0 | −16.2 | 186 | 15.7 | 0.48 | 0.12 |
| EVA-1 | 0.9 | −17.6 | 122 | 8.3 | 0.52 | 0.08 |
| EVA-2 | 1.9 | −16.7 | 131 | 8.7 | 0.56 | 0.07 |
| EVA-5 | 5.9 | −18.9 | 272 | 17.2 | 0.51 | 0.13 |
| EVA-NC0[d] | 0 | −16.9 | 206 | 18.1 | 0.49 | 0.13 |
| EVA-NC1 | 0.84 | −17.6 | 142 | 9.7 | 0.56 | 0.09 |
| EVA-NC2 | 2.1 | −18.3 | 157 | 11.2 | 0.48 | 0.10 |
| EVA-NC5 | 5.6 | −17.9 | 290 | 30.7 | 0.41 | 0.15 |

[a]Measured by TGA.
[b]Measured as peak height.
[c]Contains EVA (80 wt %) and PVAc (20 wt %).
[d]Contains EVA (80 wt %) and PVAc-B (20 wt %).

Figure 19:
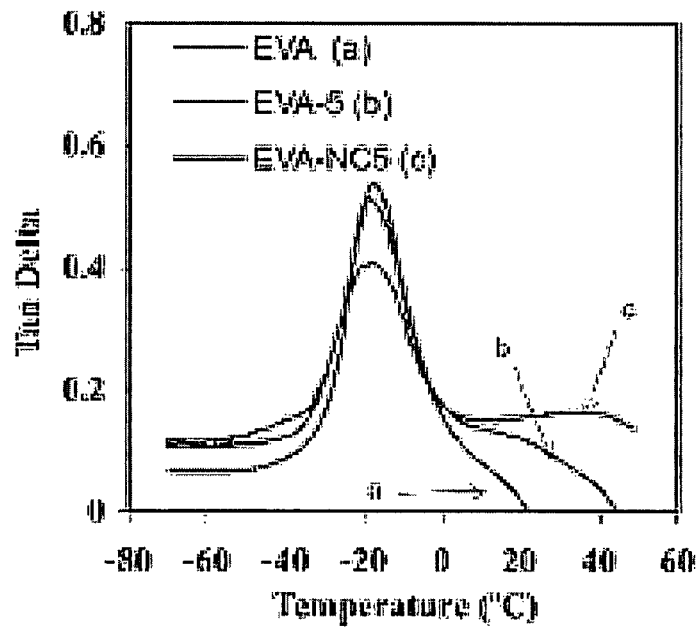
FIG. 19 is a graph illustrating the tan δ of EVA and EVA/silicate nanocomposites EVA-5 and EVA-NC5.
Figure 20:
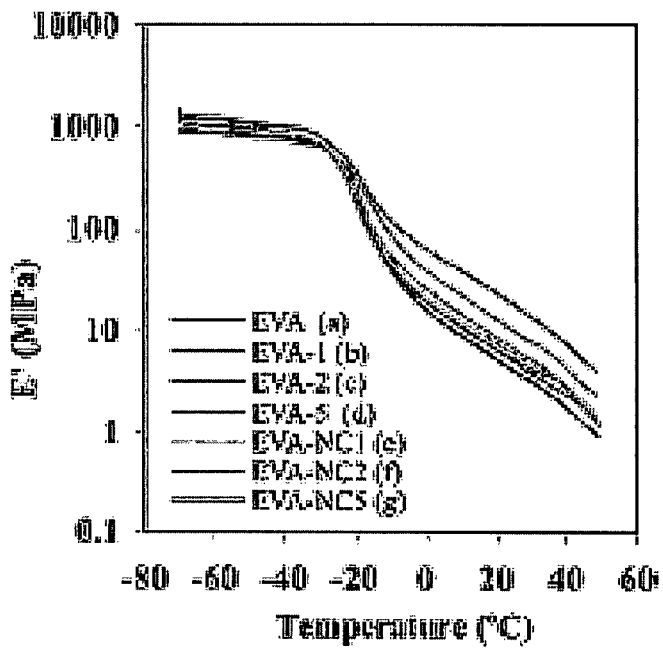
FIG. 20 is a graph illustrating the storage modulus versus temperature for EVA and its nanocomposites.

The temperature dependence of tan δ and storage modulus are plotted in FIGS. 19 and 20, respectively. Examination of the tan δ plots and the data in Table 12 revealed that the dynamic The tan δ peak ($T_g$) reflects polymer segmental motion in the amorphous domain. However, the $T_g$ values of the EVA/silicate nanocomposites will be influenced not just by the amorphous domain of EVA but also by (a) the additional PVAc from the masterbatch and (b) the silicate. On one hand, since PVAc has a higher $T_g$ than EVA, one might expect the addition of PVAc to EVA to lead to an increase in $T_g$. On the other hand, the crystalline domain of the polyethylene component of EVA would be reduced by the addition of amorphous PVAc and clay, as supported by literature reports. This would be expected to result in lower $T_g$. In addition, the impact of clay on $T_g$ of polymer/clay nanocomposites can be in either direction. In the present case, the addition of silicate caused lowering of the $T_g$. Hence, it appears there is some cancellation of the two opposing effects, leading to essentially no change in the $T_g$.

As can be seen in FIG. 19, the heights of tan δ peaks for neat EVA and EVA-5 are very close to each other, although the latter is broader. In contrast, the EVA-NC5 nanocomposite with almost the same silicate content showed a much smaller but broader transition peak than all samples. Closer examination of the tan δ peaks revealed a clear trend of decreasing peak height with increasing silicate content. Thus, the height of the tan δ peak decreased from 0.49 for EVA-NC0 (control) to 0.41 for EVA-NC5 (Table 4). In comparison, the heights of tan δ peaks for EVA-1, -2, and -5 were close to the value for neat EVA, which might be associated with the inhomogeneity of the intercalated structure of these nanocomposites. One possible explanation for these observations is that in EVA-NC5, the EVA polymer chains had slightly more restricted mobility because of their interaction with the PVAc chains anchored to the silicate. However, in EVA-5, the PVAc chains were not attached to the silicate, and the mobility of the EVA chains was not confined in the same way as in EVA-NC5. Evidently, this effect is enough to cause broadening and, hence, reduction of intensity of the glass transitions but not enough to significantly affect the transition temperature.

Figure 21:
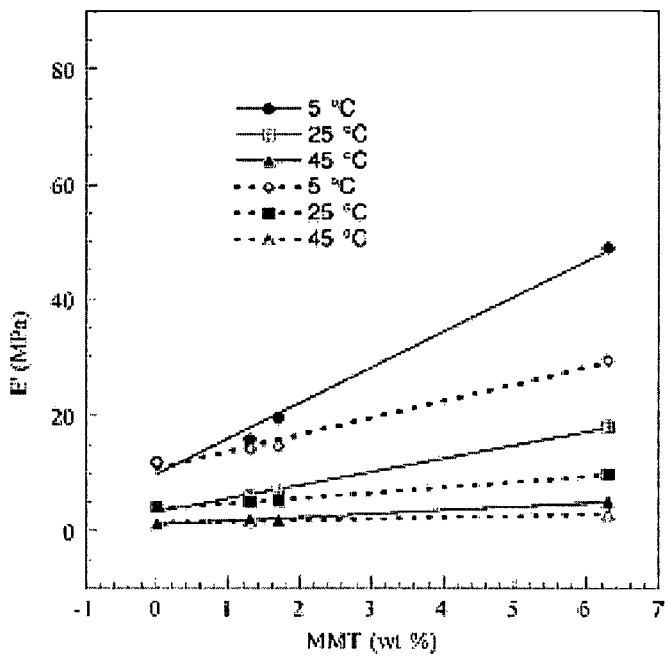
FIG. 21 is a graph illustrating the storage modulus versus MMT content for EVA nanocomposites at different temperatures.

To determine effect of the silicate on storage modulus, dynamic mechanical analysis was carried out. FIG. 20 shows the storage modulus temperature plots for the various nanocomposites. FIG. 21 shows the plots of storage modulus versus silicate content at selected temperatures for the EVA-NC series. In general, the nanocomposites showed enhancement in modulus compared to EVA. This effect depended on the MMT loading. Thus, for each series the storage modulus increased as the silicate content increased. Furthermore, at temperatures above $T_g$, the storage moduli of the exfoliated nanocomposites (EVA-NC1, -NC2, and -NC5) were higher than those of the corresponding intercalated nanocomposites (EVA-1, -2, and -5) containing comparable amounts of silicate (FIG. 20). For example, at 15° C. the storage modulus of EVA-NC5 increased 4.4 times that of EVA compared to the 2.4-fold improvement for EVA-5 (Table 12). This reinforces the premise that the extent of exfoliation of the silicate layers plays a significant role in property improvements.

Figure 22:
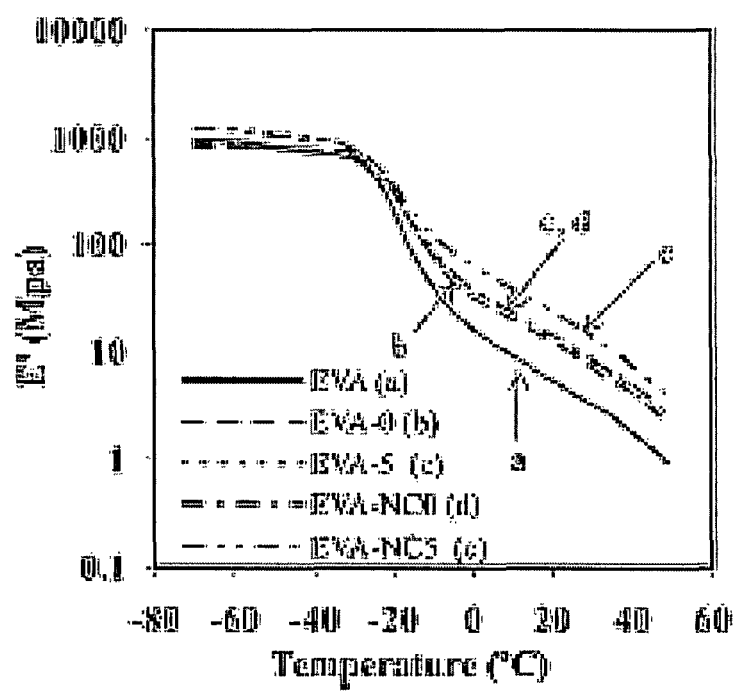
FIG. 22 is a graph illustrating the storage modulus versus temperature for EVA/silicate nanocomposites and EVA/PVAc blends.

An important question arises regarding the relative contributions of both the silicate and the PVAc copolymer from the masterbatch to the observed differences in properties. To address this question, EVA/PVAc blends were prepared without adding MMT and their dynamic mechanical properties were measured, as shown in FIG. 22. The composition and properties are summarized in Table 13.

TABLE 13

EVA/MMT Composites and Corresponding EVA/PVAc Blends

| nanocomposite | masterbatch | PVAc wt % | MMT wt % (TGA) | $T_g$ (° C.) | E' (MPa) at 15° C. | tan δ at 15° C. |
|---|---|---|---|---|---|---|
| EVA | N/A | 0 | 0 | −17.4 | 7 | 0.05 |
| EVA-0 | PVAc | 20 | 0 | −16.2 | 15.7 | 0.12 |
| EVA-5 | PVAc-20 | 20 | 5.9 | −18.9 | 17.2 | 0.13 |
| EVA-NC0 | PVAc-B | 20 | 0 | −16.9 | 18.1 | 0.13 |
| EVA-NC5 | PVAc-B20 | 20 | 5.6 | −17.9 | 30.7 | 0.15 |

EVA-0 contained about 20 wt % PVAc while EVA-NC0 contained about 20 wt % of the copolymer very close to the actual polymer contents in the corresponding EVA-5 and EVA-NC5 nanocomposites, respectively. The storage moduli of EVA-5, EVA-NC5, and the corresponding blends EVA-0 and EVA-NC0 are plotted in FIG. 22.

Clearly, upon addition of just PVAc or cationic PVAc copolymer to EVA the storage modulus increased by more than a factor of 2 (2.4 for EVA-0 and 2.5 for EVA-NC0). This suggests that the component polymers contribute significantly to the property improvement, with the copolymer being slightly more effective than PVAc. Further improvement was observed upon addition of MMT. Thus, the storage modulus of EVA-5 increased by factors of 2.6 and 1.1 over the storage modulus of EVA and that of the blend EVA-0, respectively. The exfoliated nanocomposite, EVA-NC5, showed the most improvement in storage modulus, increasing by factors of 4.4 and 1.7 over the storage modulus of EVA and that of the corresponding blend EVANC0, respectively, and by a factor of 1.8 over that of the intercalated EVA-5 nanocomposite. Therefore, the improvement in storage modulus was due to the synergistic effect of the silicate and the polymer incorporated into the masterbatch, and the improvement was highest when the silicate was well exfoliated in the polymer matrix.

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. An ethylene-vinyl acetate copolymer (EVA) blend comprising ethylene-vinyl acetate copolymer (EVA) and from 4 to 20 wt % polymer miscible with EVA and 0.5 to 10 weight percent silicate based on the EVA blend,
    wherein the silicate is substantially exfoliated, and
    wherein the substantially exfoliated silicate and the polymer miscible in EVA are bonded to each other through electrostatic forces.

2. The blend of claim 1 where the tensile strength of the blend is increased at least 1.10 times and Young's modulus of the blend are at least 1.40 times that of neat EVA.

3. The blend of claim 2 comprising EVA and poly(vinyl acetate) (PVAc)/silicate nanocomposite where the silicate content of the PVAc/silicate nanocomposite is substantially exfoliated and ranges from 2 to 25 weight percent of the PVAc/silicate nanocomposite.

4. The blend of claim 3 where the PVAc is cationically functionalized PVAc having $M_n$ ranging from 10,000 to 100,000 grams/mol and the cationically functionalized PVAc contains from 99.8 to 95 mol percent vinyl acetate units and from 0.2 to 5 mole percent cationically functionalized acrylate units based on moles of cationically functionalized PVAc.

5. The blend of claim 4 where the EVA has melt index ranging from 25 g/10 minutes to 500 g/10 minutes and vinyl acetate content ranging from 20 to 50 weight percent.

6. The blend of claim 5 which contains EVA and PVAc/silicate nanocomposite in proportions such that the substantially exfoliated silicate amounts to 0.5 to 10 weight percent of the blend.

7. The blend of claim 1 comprising from 4 to 6 weight percent silicate and the flammability of the blend is reduced compared to neat EVA.

8. The blend of claim 2 comprising 4 to 6 weight percent silicate and the flammability of the blend is reduced compared to neat EVA.

9. The blend of claim 1, wherein the substantially exfoliated silicate is uniformly dispersed within the polymer miscible in EVA.

10. The blend of claim 1, where the polymer miscible in EVA is PVAc, polyethylene, polypropylene, poly(vinyl acetate), cellulose acetate butyrate, or poly(vinyl chloride).

11. The blend of claim 1, where the polymer miscible in EVA is cationically charged, the silicate surface is negatively charged and an electrostatic interaction binds the polymer miscible in EVA to the surface of the silicate.

12. The blend of claim 1, where the polymer miscible in EVA is PVAc.

13. An ethylene-vinyl acetate copolymer (EVA) blend comprising ethylene-vinyl acetate copolymer (EVA) and from 4 to 20 wt % polymer miscible with EVA and 0.5 to 10 weight percent silicate based on the EVA blend, where the silicate is substantially exfoliated,
where the polymer miscible in EVA is PVAc, polyethylene, polypropylene, poly(vinyl acetate), cellulose acetate butyrate, or poly(vinyl chloride), and
where the polymer miscible in EVA is cationically charged and the silicate surface is negatively charged and an electrostatic interaction binds the polymer miscible in EVA to the surface of the silicate.

14. The blend of claim 13 where the tensile strength of the blend is increased at least 1.10 times and Young's modulus of the blend are at least 1.40 times that of neat EVA.

15. The blend of claim 13 where the polymer miscible in EVA is PVAc, the PVAc is cationically functionalized PVAc having $M_n$ ranging from 10,000 to 100,000 grams/mol and the cationically functionalized PVAc contains from 99.8 to 95 mol percent vinyl acetate units and from 0.2 to 5 mole percent cationically functionalized acrylate units based on moles of cationically functionalized PVAc.

16. The blend of claim 15 where the EVA has melt index ranging from 25 g/10 minutes to 500 g/10 minutes and vinyl acetate content ranging from 20 to 50 weight percent based on the EVA blend.

17. The blend of claim 15 which contains EVA and PVAc/silicate nanocomposite in proportions such that the substantially exfoliated silicate amounts to 0.5 to 10 weight percent of the blend based on the EVA blend.

18. The blend of claim 13 comprising 4 to 6 weight percent silicate based on the EVA blend and the flammability of the blend is reduced compared to neat EVA.

19. The blend of claim 14 comprising from 4 to 6 weight percent silicate based on the EVA blend and the flammability of the blend is reduced compared to neat EVA.

20. The blend of claim 13, where the polymer miscible in EVA is PVAc.

* * * * *

UNITED STATES PATENT AND TRADEMARK OFFICE
CERTIFICATE OF CORRECTION

| | | |
|---|---|---|
| PATENT NO. | : 7,947,774 B2 | Page 1 of 1 |
| APPLICATION NO. | : 11/976102 | |
| DATED | : May 24, 2011 | |
| INVENTOR(S) | : Sogah et al. | |

It is certified that error appears in the above-identified patent and that said Letters Patent is hereby corrected as shown below:

Col. 26, line 5
Claim 17, line 1, "claim 15" should read --claim 16--.

Signed and Sealed this
Sixteenth Day of August, 2011

David J. Kappos
*Director of the United States Patent and Trademark Office*